(12) United States Patent
Tang et al.

(10) Patent No.: US 11,703,835 B2
(45) Date of Patent: Jul. 18, 2023

(54) METHODS, SYSTEMS AND DATA STRUCTURES FOR OPTIMIZING PARAMETER DATA RETRIEVAL FROM DEVICES IN A CONTROL SYSTEM

(71) Applicant: Yokogawa Electric Corporation, Musashino (JP)

(72) Inventors: Tung Ngie Tang, Singapore (SG); Kim Fatt Ng, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 214 days.

(21) Appl. No.: 17/171,134

(22) Filed: Feb. 9, 2021

(65) Prior Publication Data

US 2022/0253047 A1 Aug. 11, 2022

(51) Int. Cl.
*G06F 16/90* (2019.01)
*G05B 19/418* (2006.01)
*G06F 16/9035* (2019.01)
*G06F 16/907* (2019.01)
*G05B 19/40* (2006.01)

(52) U.S. Cl.
CPC ... *G05B 19/41865* (2013.01); *G05B 19/4183* (2013.01); *G05B 19/41885* (2013.01); *G06F 16/907* (2019.01); *G06F 16/9035* (2019.01)

(58) Field of Classification Search
CPC .................................................. G06F 16/9035
See application file for complete search history.

(56) References Cited

U.S. PATENT DOCUMENTS

2008/0082193 A1\* 4/2008 Enver .............. G05B 19/41865
700/100

\* cited by examiner

*Primary Examiner* — Kristopher Andersen
(74) *Attorney, Agent, or Firm* — Sheridan Ross P.C.

(57) ABSTRACT

The invention relates to the field of industrial automation and process control systems. More specifically, the invention provides methods, systems and computer program products that optimize scheduling of parameter data retrieval from devices that are coupled with and controlled by a control system. In a particular embodiment, the invention provides methods, systems and computer programs for scheduled parameter data retrieval from one or more field devices implemented within a process control environment. In other embodiments, the invention additionally provides methods, systems and computer programs for retrievably storing a scheduling map for enabling scheduled parameter data retrieval from one or more field devices implemented within a process control environment.

21 Claims, 20 Drawing Sheets

```
                    ┌─────────┐
                    │  Start  │
                    └────┬────┘
                         ▼
┌──────────────────────────────────────────────────────────────────┐
│ Segment a full chronological period that is covered by a scheduling
│ algorithm into *n* time segments – wherein
│     o  the duration of each time segment is equal to the period
│        after which data retrieval requires to be repeated for the
│        one or more of the device parameter(s) under consideration
│        (i.e. the periodicity of required data retrieval),
│     o  each time segment comprises *m* chronologically ordered
│        time slots, wherein (i) the duration of each time slot is equal
│        to the smallest time interval that is defined for a data
│        acquisition controller to retrieve a device parameter from a
│        field device, and (ii) each time slot has *p* associated
│        parameter retrieval sub-slots, wherein each of the
│        parameter retrieval sub-slots enables retrieval of a device
│        parameter from a field device
└──────────────────────────────────────────────────────────────────┘ ─ 602
                         ▼
┌──────────────────────────────────────────────────────────────────┐
│ Parse, in increasing chronological order, the *m* time slots within the
│ first of the *n* time segments to identify an available set of 'dirty' time
│ slots such that
│     o  the identified set of 'dirty' time slots satisfies the parameter
│        data retrieval constraints associated with the one or more
│        device parameter(s) that are sought to be scheduled for
│        retrieval from a field device, and
│     o  each of the other (n-1) chronologically successive segments
│        includes a corresponding set of 'dirty' time slots having the
│        same position within said successive segment as the
│        position of the identified set of 'dirty' time slots within the
│        first time segment identified at step 602– wherein said
│        corresponding set of 'dirty' time slots is also available for
│        retrieval of the one or more device parameter(s) that are
│        sought to be scheduled for retrieval from the field device
└──────────────────────────────────────────────────────────────────┘ ─ 604
                         ▼
                    ┌─────────┐
                    │   End   │
                    └─────────┘
```

Figure 6
(PRIOR ART)

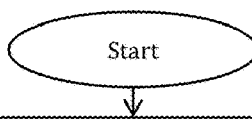

Start

Define a variable column table comprising a plurality of rows and columns, wherein:
- Each row is assigned to a unique value corresponding to periodicity of data retrieval associated with one or more device parameters of one or more field devices (i.e. the 'parameter retrieval frequency')
- Each row has a variable number of columns, wherein (i) the number of columns assigned to a row is a value determined by dividing the unique value corresponding to periodicity of data retrieval for that row, by the smallest time interval that is defined for a data acquisition controller to retrieve a device parameter from a field device, and (ii) each column represents a specific time slot within the full chronological period that is covered by the scheduling algorithm
- Each cell corresponding to an intersection of a row and column is configured to store data representing a number of used parameter retrieval sub-slots or the number of available parameter retrieval sub-slots corresponding to a specific time slot

⎩ 1402

Responsive to scheduling of parameter retrieval (for a device parameter from a field device) within a parameter retrieval sub-slot in accordance with the teachings of the present invention:
- Identify a row corresponding to the parameter retrieval frequency for said device parameter / field device
- Within the identified row, increment (by one) the number of used parameter retrieval sub-slots at the time slot within which the parameter retrieval has been scheduled (or decrement the number of available parameter retrieval sub-slots at the time slot within which the parameter retrieval has been scheduled)
- For each row that corresponds to a higher parameter retrieval frequency than the identified row:
  - increment (by one) the number of used parameter retrieval sub-slots at the time slot within which the parameter retrieval has been scheduled (or decrement the number of available parameter retrieval sub-slots at the time slot within which the parameter retrieval has been scheduled), AND
  - increment (by one) the number of used parameter retrieval sub-slots at each column where the corresponding time slot represented by said column is capable of being represented as the sum of (i) a time value corresponding to the time slot within which the parameter retrieval has been scheduled and (ii) an integer multiple of the 'parameter retrieval frequency' for the data parameter / field device
- For each row that corresponds to a lower parameter retrieval frequency than the identified row:
  - determine a time slot value 'x' that is the modulus of the time value corresponding to the time slot within which the parameter retrieval has been scheduled divided by said lower parameter retrieval frequency
  - increment (by one) the number of used parameter retrieval sub-slots at the time slot represented by time slot value 'x' (or decrement the number of available parameter retrieval sub-slots at the time slot represented by time slot value 'x'), AND
  - increment (by one) the number of used parameter retrieval sub-slots at each time slot that has a value corresponding to the determined modulus (or decrement the number of available parameter retrieval sub-slots within the time slot corresponding to the determined modulus value)

⎩ 1404

End

Figure 14

METHODS, SYSTEMS AND DATA STRUCTURES FOR OPTIMIZING PARAMETER DATA RETRIEVAL FROM DEVICES IN A CONTROL SYSTEM

FIELD OF THE INVENTION

The invention relates to the field of industrial automation and process control systems. More specifically, the invention provides methods, systems and computer program products that optimize scheduling of parameter data retrieval from devices that are coupled with and controlled by a control system.

BACKGROUND OF THE INVENTION

Industrial environments implement control systems (for example, distributed process control systems) for running and controlling processes for manufacturing, conversion, or production. Control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, and measuring process and/or environmental parameters (e.g. temperature or pressure) for controlling one or more processes within the process plant or system.

At the other end, a process controller within the control system may be configured to receive signals generated by field devices, wherein the received signals convey information corresponding to process parameters measured by the field devices and/or other information concerning states of the field devices. The process controller may additionally execute a control application that implements one or more control modules for implementing process control decisions. Control modules within the process controller send control signals to field devices through control networks, to control operation of one or more of the field devices. Input-output (I/O) devices that are located as communication intermediaries between a process controller and one or more field devices enable data transfer and control instruction transfers between the process controller and the field devices, by converting electrical signals to digital values and by sending and receiving such signals over one or more communication protocols, such as HART, Profitbus or Foundation Fieldbus protocols.

A control system within a process plant may include one or more process controllers, and each controller is connected to one or more field devices via I/O cards and/or I/O ports. The one or more controllers store control applications and implement control strategies for the control and operation of field devices. The control system may be configured to track or collect parameter data related to the various plant assets or plant equipment, including, but not limited to, field devices, rotating equipment and key machineries. The control system retrievably stores device-related data and/or performance data for all devices or assets in a plant or group of plants, for the purposes of monitoring the statuses and health of plant assets and conducting maintenance work. Additionally, the control system may be configured to serve as a communication intermediary between a plant operator or an operator terminal on one hand, and one or more field devices on the other hand—for the purposes of enabling efficient configuration, commissioning, inspection, and maintenance of such field devices.

For the purposes of the present written description, it will be understood that references to a "field device" may include references to any of valves, valve actuators, switches, transmitters, smart transmitters, positioners, or other sensor devices that may be located within an industrial process environment, and that may be configured for physical or process control functions. Field devices may include "smart" field devices—i.e. devices that support digital communication protocols such as HART or Foundation Fieldbus communication protocols.

For the purposes of the present written description, references to "control system(s)" shall be understood as references to any control system(s) that may be implemented within a process control environment, an industrial plant, or an industrial environment, and shall include distributed control systems (DCS) and/or safety control systems (SCS).

FIG. 1 illustrates a process control environment 100 of a type that may be used for process control within an industrial environment. Process control environment 100 comprises an operator terminal 102, a control system 104, and a field device network 106.

Operator terminal 102 comprises any processor implemented terminal device or client device communicably coupled with control system 104. Operator terminal 102 may be configured to enable an operator to transmit instructions to and receive data from, control system 104.

Control system 104 comprises a control system server 104a, a control system database 104b and a control system gateway interface 104c. Control system server 104a may include at least one processor, and one or more transitory and/or non-transitory memories. Control system server 104a may be configured to implement one or more functions of a process controller discussed above. Control system database 104b may include a non-transitory memory based database, configured to store data records corresponding to field devices, including for example, device parameter data, device configuration data, device description files, and device documents corresponding thereto. Control system gateway interface 104c may include a hardware or software network gateway configured to enable transmission and receipt of communications by control system 104.

During operation of a control system, parameter data corresponding to a field device (i.e. state data representing a state of the field device or representing a state of an operating environment monitored by the field device) is required to be periodically retrieved by an asset management system for monitoring and control purposes. Parameter data retrieval and acquisition by the asset management system from field devices coupled with the control system is an essential part of the monitoring and control functions of the control system, for the reason that periodically retrieved parameter data enables the control system and control system operators to monitor the health and status of the control system, and to implement control decisions or control policies based on real time data received from field devices. For example, in case of a flow sensor type field device, parameter data that may be retrieved from such field device may include device health status data and measured flow data—which may be used to control performance of the flow sensor type field device.

As a consequence, one of the critical functions of the asset management system is to schedule retrieval of parameter data from field devices within one or more scheduling tables, so that such parameter data can be retrieved periodically according to the retrieval schedule defined by the one or more scheduling tables.

Each scheduling table may manage parameter data retrieval and parameter data retrieval constraints associated with field devices within a particular area in the plant. The structure or schema of the scheduling table may be selected according to the parameter data retrieval constraints associated with such field devices. For example, in the case of field devices of FCS0801's Slot 3 type having I/O module AA1441(HART communication), the total number of parameters that can be simultaneously read from such field devices at any one time is 8. As a result, the scheduling table for such field devices, or for an area in the plant that requires control and/or monitoring of such devices, would be structured such that each distinct time slot within the scheduling table has 8 corresponding parameter retrieval sub-slots, which means the retrieval of upto 8 corresponding parameters could be performed within each time slot. It will be understood that the sub-slots within a time slot do not comprise chronologically discrete sub-slots. Instead, the number of discrete sub-slots within a time-slot represents the number of discrete field device parameters that can be simultaneously retrieved from the corresponding field devices within such time slot. The retrieval of each field device parameter within each sub-slot of a time slot occurs simultaneously with retrieval of all other field device parameters within the remaining sub-slots of said time slot. For example, if a time slot has a fixed time interval of 5 seconds, and has 4 sub-slots, this means that said time slot enables simultaneous retrieval of 4 discrete device parameters from field device(s) and that all 4 device parameters will be retrieved simultaneously within the 5 second interval corresponding to the time slot.

FIG. 2 illustrates an exemplary database 200 of a kind that may be used by a control system—wherein the database 200 stores one or more distinct scheduling tables. In the illustration of FIG. 2, database 200 includes (i) FCS A communication protocol A Scheduling Table 202—which is a scheduling table for scheduling retrieval of parameter data from a first set of field devices controlled by a first field control station FCS A, wherein the first set of field devices communicate and operate using a first communication protocol A, for instance HART (ii) FCS A communication protocol B Scheduling Table 204—which is a scheduling table for scheduling retrieval of parameter data from a second set of field devices controlled by the first field control station FCS A, wherein the second set of field devices communicate and operate using a second communication protocol B, for instance, Fieldbus Foundation and (iii) FCS B communication protocol B Scheduling Table 206—which is a scheduling table for scheduling retrieval of parameter data from a third set of field devices controlled by a second field control station FCS B, wherein the third set of field devices communicate and operate using the second communication protocol B. It would be understood that the number and individual configurations of scheduling tables used by a control system for implementing periodic parameter data retrieval from field devices coupled with the control system can vary depending on the configuration and requirements of individual control systems and industrial environments.

FIG. 3 illustrates a structure for an exemplary scheduling table of a kind that is known and implemented within prior art solutions. Scheduling table 300 comprises a data structure configured to store data corresponding to a plurality of time slots 302a upto 302n, wherein each time slot spans a time interval of 5 seconds and comprises four parameter retrieval sub-slots (i.e. 3021a, 3022a, 3023a, 3024a, upto 3021n, 3022n, 3023n, 3024n). It would be understood that the number of parameter retrieval sub-slots per time slot is determined by the field device types and/or field device communication protocols involved in the parameter data retrieval that requires to be scheduled by means of the scheduling table. While the illustration of FIG. 3 only shows 13 time slots, which covers a chronological period of 1 min and 5 seconds, it would be understood that the scheduling table may include sufficient time slots to span a full chronological period that is sought to be covered by the scheduling table. Routinely, a scheduling table covers a full chronological period of 24 hours, and in which case, assuming a time interval of 5 seconds per time slot, the exemplary scheduling table 300 may include a total of 17280 time slots (calculated as 12*60*24 (i.e. 12 time slots of 5 second intervals per minute) aggregated over every 60 minute period within a full chronological period of 24 hours), and each spanning a 5 second interval.

A control system relies on scheduling processes or algorithms for scheduling parameter data retrieval from one or more field devices into time slots and corresponding parameter retrieval sub-slots within a scheduling table. As explained in more detail below, existing methods for scheduling parameter data retrieval are inefficient as they tend to schedule retrieval of device parameters according to the earliest available time slot that has an appropriate number of empty parameter retrieval sub-slots, regardless of any other considerations.

FIG. 4A illustrates method steps involved in conventional methods of scheduling parameter data retrieval from one or more field devices. FIG. 4B illustrates the manner in which a conventional scheduling table of a kind illustrated and discussed above in connection with FIG. 3 is populated and utilized based on the method of FIG. 4A. FIG. 5 illustrates exemplary outcomes and drawbacks of implementing the method of FIG. 4A.

A discussion regarding FIGS. 4A, 4B and 5 requires an understanding of the concepts of 'fresh' time slots and 'dirty' time slots. A 'fresh' time slot refers to a time slot wherein none of the parameter retrieval sub-slots within said time slot have been assigned for the purpose of scheduling retrieval of any device parameter. A 'dirty' time slot refers to a time slot where some but not all of the parameter retrieval sub-slots associated with said time slot have been assigned for the purpose of scheduling retrieval of any device parameter.

Step 402A of FIG. 4A comprises receiving (for example, at a control system or at a component thereof), an instruction for scheduling retrieval of one or more device parameter(s) from a field device.

Step 404A comprises identifying one or more parameter data retrieval constraints associated with the field device or one or more of the device parameters, including any of (i) number of device parameters for retrieval, (ii) periodicity of data retrieval required for one or more of the device parameter(s), and (iii) any applicable data simultaneity requirement(s) associated with the device parameter(s). The term 'data simultaneity requirement' may be understood to comprise a requirement that the time separating retrieval of any two or more device parameters from a field device shall not exceed more than a defined time interval. For example, two device parameters corresponding to a field device may have a data simultaneity requirement that retrieval of both device parameters shall occur within the same five second interval, or shall occur no later than 'x' seconds apart from each other.

Step 406A involves parsing a scheduling table or scheduling database in increasing chronological order to identify the earliest available 'fresh' time slot that satisfies the identified parameter data retrieval constraints corresponding to the device parameter(s) under consideration.

Responsive to unavailability of any 'fresh' time slot that satisfies the identified parameter data retrieval constraints, step 408A involves parsing the scheduling database or table in increasing chronological order, to identify an earliest available set of 'dirty' time slots (comprising one or more 'dirty' time slots) that satisfy the identified parameter data retrieval constraints. In certain embodiments, an earliest available set of 'dirty' time slots that are identified as being suitable may comprise a plurality of time slots which together have a sufficient number of available parameter retrieval sub-slots, and which are separated from each other by time intervals that satisfy any applicable data simultaneity constraint(s) corresponding to the device parameter(s) under consideration.

Step 410A comprises scheduling retrieval of the one or more device parameters from the field device within the identified 'fresh' time slot or the identified set of 'dirty' time slots, by assigning said one or more device parameters to the relevant parameter retrieval sub-slots in the identified time slot(s), within the scheduling table.

Referring to the scheduling table 400B of FIG. 4B, the method of FIG. 4A may be understood in more detail with reference to an example.

In the example under consideration, the first device parameter sought to be scheduled for retrieval is device parameter Dev001—which is scheduled into a parameter retrieval sub-slot 4021a in the earliest available fresh time slot 402a (i.e. the time slot at time 0:00 and with no device parameter being scheduled within it prior to Dev001). Thereafter, since device parameter Dev001 also has a periodicity constraint of 60 seconds, it is also scheduled into a parameter retrieval sub-slot 4021m within time slot 402m (i.e. the time slot at time 1:00). Similarly, device parameters Dev002, Dev003, Dev004, Dev005, Dev006, Dev007, Dev008, Dev009, Dev010, Dev011 and Dev012 are serially all scheduled for retrieval in the chronologically earliest available fresh time slots 402b, 402c till 402l respectively, since till Dev012 there is still a fresh time slot (402l) available for it to be scheduled (i.e. time slots at 0:05, 0:10, 0:15, 0:20, 0:25, 0:30, 0:35, 0:40, 0:45, 0:50, and 0:55 respectively). Since device parameter Dev002 has a periodicity constraint of 60 seconds, it is also scheduled at parameter retrieval sub-slot 4021n within time slot 402n (i.e. the time slot at time 1:05).

Subsequently, it will be noted that there are no fresh time slots available, and as a result, device parameters Dev013 and Dev014 are scheduled for retrieval in parameter retrieval sub-slots 4022a and 4023a within the earliest available dirty time slot 402a that satisfies the relevant parameter data retrieval constraints corresponding to these device parameters. Thereafter, since device parameters Dev013 and Dev014 also each have a periodicity constraint of 60 seconds, they are also scheduled at respective parameter retrieval sub-slots 4022m, 4023m within time slot 402m (i.e. the time slot at time 1:00).

When seeking to schedule retrieval of device parameter Dev015, it is found that despite time slot 402a (at 0:00) being an earliest available dirty time slot, the only available parameter retrieval sub-slot 4024a within this time slot 402a does not match one or more of the parameter retrieval constraints associated with device parameter Dev015. Accordingly, the method searches for the next available dirty time slot which has one or more available parameter retrieval sub-slots that match all parameter retrieval constraints associated with device parameter Dev015. This is found at time slot 402b (i.e. at 0:05) and retrieval of device parameter Dev015 is therefore scheduled within the parameter retrieval sub-slot 4022b therewithin.

The prior art method of FIG. 4A invariably creates problems for the reason that different field devices (or device parameters corresponding to different field devices) often have different 'periodicity' constraints—wherein a periodicity constraint defines a period or time interval between two consecutive retrieval events corresponding to a particular device parameter. Using conventional methods for parameter retrieval scheduling may result in early time slots being assigned to device parameters having high periodicity constraint values. As a consequence, device parameters that have lower periodicity constraint values are no longer capable of being scheduled for retrieval, since one or more of the early time slots which would necessarily need to have been allocated to such device parameters having lower periodicity constraint values are now unavailable for assignment. Therefore, schedule overflow errors are routinely observed when trying to schedule retrieval of device parameters having lower periodicity constraints (i.e. which require retrieval at more frequent intervals) even though the scheduling table may not be completely utilized.

For example, the illustration in FIG. 5 shows an example of implementation of the prior art method of FIG. 4A, wherein the first 15 device parameters that are added to the scheduling table each have a 10 minutes acquisition periodicity requirement. As a result, the first 15 time slots covering all time intervals between 0 seconds and 75 seconds are completely taken up. Thereafter the 16th device parameter that has a 1 minute acquisition periodicity requirement would be unable to be added to the scheduling table—for the reason that all time slots (i.e. 0 to 55 seconds) within the first minute of the scheduling table have already been taken up, resulting in an overflow error.

In scheduling parameter data retrieval in accordance with the method of FIG. 4A, when a suitable time-slot (and corresponding parameter retrieval sub-slot) is identified for scheduling a first parameter data retrieval corresponding to a device parameter, it is additionally essential to ascertain whether corresponding time-slots (i.e. a suitable time slot is added by n times of periodicity of required data retrieval, and n represents an integer) and associated parameter retrieval sub-slots are also available for each subsequent iteration of parameter data retrieval corresponding to the same device parameter in accordance with the relevant periodicity constraint(s).

This method is discussed in connection with FIG. 6—which is a flowchart illustrating a method of verifying that a potential time slot and parameter retrieval sub-slot that is being considered for scheduling a first iteration of parameter data retrieval corresponding to a device parameter, is in fact also available at each subsequent iteration of parameter data retrieval that is necessitated by the periodicity constraint(s) associated with said device parameter.

Step 602 comprises segmenting a full chronological period that is covered by a scheduling method or algorithm (or by a scheduling table) into n time segments—wherein (i) the duration of each of the n time segments is equal to the period after which data retrieval requires to be repeated for the one or more of the device parameter(s) under consideration (i.e. the periodicity of required data retrieval), and (ii) each of said n time segments comprises m chronologically ordered time slots, wherein (a) the duration of each time slot is equal to the smallest time interval that is defined for a data acquisition controller to retrieve a device parameter from a field device, and (b) each time slot has p associated parameter retrieval sub-slots, wherein each of the parameter retrieval sub-slots enables retrieval of a device parameter from a field device. For example, assume a full chronological period of 24 hours that is covered by a scheduling method or algorithm, a device parameter that has a parameter retrieval periodicity of 30 minutes, and wherein 5 seconds is the smallest time interval that is defined for a data acquisition controller to retrieve a device parameter from a field device. In this case, step 602 will result in segmenting of the 24 hour period into 48 (n=48) time segments of 30 mins each. Each of the 48 time segments comprises 360 (m=360) chronologically ordered time slots—each having a duration of 5 seconds. Each of the 360 time slots in a time segment has a number of parameter retrieval sub-slots p (e.g. p=8), in the case where p is equal to 8, the time slot enables simultaneous retrieval of 8 device parameters from a field device.

Step 604 comprises parsing, in increasing chronological order, the m chronologically ordered time slots within the first of the n time segments to identify an available set of 'dirty' time slots such that (i) the identified set of 'dirty' time slots satisfies the parameter data retrieval constraints associated with the one or more device parameter(s) that are sought to be scheduled for retrieval from a field device, and (ii) each of the other (n−1) chronologically successive segments includes a corresponding set of 'dirty' time slots having the same positions within said successive segment as the position of the identified set of 'dirty' time slots within the first time segment identified at step 602—wherein said corresponding set of 'dirty' time slots is also available for retrieval of the one or more device parameter(s) that are sought to be scheduled for retrieval from the field device. It would be understood that two time slots within two different segments would have the same position within their respective segments, if each of the two time slots is preceded by an identical number of time slots within its respective segment, as the other of the two time slots. So for example, considering a first time segment covering time slots 1 to 360 each of 5 seconds duration (i.e. from 0 seconds to 1795 seconds), and a second time segment covering time slots 361 to 720 each of 5 seconds duration (i.e. from 1800 seconds to 3595), the 2nd time slot (at 5 seconds) within the first time segment, and the 362nd time slot (at 1805 seconds) would both be considered as having the same position each of the two is preceded by a single time slot within its respective segment. Likewise, the 3rd time slot (at 10 seconds) within the first time segment, and the 363rd time slot (at 1810 seconds), the 4th time slot (at 15 seconds) within the first time segment, and the 364th time slot (at 1815 seconds), and so on, would respectively be considered as having the same positions within their respective time segments.

For the purposes of understanding the outcomes of the method of FIG. 6, the method may be considered in connection with the illustration of FIG. 4B. For example, if device parameter Dev001 has a periodicity constraint of 60 seconds (i.e. retrieval requires to be repeated every 60 seconds), then before assigning retrieval of device parameter Dev001 to a parameter retrieval sub-slot within time slot 402a (i.e. at 0:00), provided time slot 402a at 0:00 satisfies the parameter data retrieval constraints, the method also needs to check for an available time slot every 60 seconds for the full chronological period of time that is covered by the scheduling process (or by a scheduling table). So for example, if the scheduling is for a 24 hours chronological period, the method will need to check availability of time slot corresponding to every subsequent 60 second period i.e. time slots associated with the 1:00 minute time slot, the 2:00 minutes time slot, the 3:00 minutes time slot upto the 1440:00 minutes time slot. It will be understood that having to parse the full chronological period of time that is covered by the scheduling process (especially where it covers large periods of time such as a 24 hour period) before each assignment of a device parameter retrieval event to a parameter retrieval sub-slot within a particular time slot is both time and resource intensive and is generally inefficient.

There is accordingly a need for addressing drawbacks of device parameter retrieval scheduling solutions that presently exist in the art.

SUMMARY

The invention relates to the field of industrial automation and process control systems. In various embodiments, the invention provides methods, systems and computer program products that optimize scheduling of parameter data retrieval from devices that are coupled with and controlled by a control system.

In an embodiment, the invention provides a method for scheduled parameter data retrieval from one or more field devices implemented within a process control environment. The method comprises (i) responding to an instruction for scheduling retrieval of a device parameter from a field device, by retrieving a scheduling table that represents a defined chronological period in the form of m chronologically ordered time slots, wherein (a) the duration of each time slot of the m chronologically ordered time slots is equal to a fixed time interval defined for retrieval of the device parameter from the field device, and (b) each time slot of the m chronologically ordered time slots has p associated parameter retrieval sub-slots, wherein each of the parameter retrieval sub-slots enables retrieval of one device parameter from the field device, (ii) identifying one or more parameter data retrieval constraints associated with the device parameter, (iii) parsing the retrieved scheduling table and identifying a set of available parameter retrieval sub-slots that satisfies the identified parameter data retrieval constraints, wherein parsing the retrieved scheduling table comprises (c) selecting from among the m chronologically ordered time slots, a first time slot for analysis, wherein the selected time slot is representable as a sum of a base time and an offset, (d) determining whether the selected time slot has an associated set of available parameter retrieval sub-slots that satisfy the identified parameter data retrieval constraints, (e) responsive to determining that the selected time slot does not have an associated set of available parameter retrieval sub-slots that satisfy the identified parameter data retrieval constraints (1) modifying the base time, (2) selectively modifying the offset, (3) selecting a next time slot from among the m chronologically ordered time slots for analysis, wherein the selected next time slot is determined by the sum of the modified base time and offset, and (f) repeating steps (c) to (f) until a selected time slot is determined as having an associated set of available parameter retrieval sub-slots that satisfy the identified parameter data retrieval constraints, and (iv) scheduling retrieval of the device parameter within the selected time slot, by recording within the scheduling table, data associating each parameter retrieval sub-slot within the identified set of parameter retrieval sub-slots with the device parameter from the field device.

The invention additionally provides a method of retrievably storing a scheduling map for enabling scheduled parameter data retrieval from one or more field devices implemented within a process control environment, the method comprising (i) generating a scheduling map configured to store data representing a number of used parameter retrieval sub-slots or a number of available parameter retrieval sub-slots corresponding to each of the m chronologically ordered time slots, wherein (a) the scheduling map is a variable column table comprising a plurality of rows and columns, (b) each row is assigned a unique value representing a parameter retrieval periodicity value associated with a device parameter corresponding to a field device, wherein the parameter retrieval periodicity value represents a defined period after which device parameter data retrieval requires to be repeated for the device parameter, (c) each row has a variable number of columns, wherein (1) the number of columns assigned to a row is determined by dividing the unique value assigned to such row, by the fixed time interval defined for retrieval of the device parameter from the field device, and (2) each column represents a specific time slot out of m chronologically ordered time slots that cumulatively represent a defined chronological period, and (c) each cell corresponding to an intersection of a row and a column stores data representing a number of used parameter retrieval sub-slots or a number of available parameter retrieval sub-slots corresponding to a specific time slot, and (ii) retrievably storing the generated scheduling map within a database that is communicably coupled with a data acquisition controller within a control system of a process control environment.

The invention additionally provides system embodiments, comprising a system configured for scheduled parameter data retrieval from one or more field devices implemented within a process control environment. The system comprises a processor implemented data acquisition controller configured for implementing any one or more method steps as described hereinabove.

Other system embodiments of the invention provide a system configured for retrievably storing a scheduling map for enabling scheduled parameter data retrieval from one or more field devices implemented within a process control environment—wherein said system may be configured for implementing any one or more method steps as described hereinabove.

The invention also provides a computer program product for scheduled parameter data retrieval from one or more field devices implemented within a process control environment. The computer program product comprising a non-transitory computer usable medium having a computer readable program code embodied therein, the computer readable program code comprising instructions for implementing within a processor based computing system, one or more method steps as described hereinabove.

Yet further, the invention provides a computer program product for retrievably storing a scheduling map for enabling scheduled parameter data retrieval from one or more field devices implemented within a process control environment. The computer program product comprising a non-transitory computer usable medium having a computer readable program code embodied therein, the computer readable program code comprising instructions for implementing within a processor based computing system, one or more method steps as described hereinabove.

BRIEF DESCRIPTION OF THE ACCOMPANYING DRAWINGS

FIGS. 4A, 4B and 6 illustrate prior art methods for scheduling parameter data retrieval from one or more field devices.

FIG. 14 is a flowchart illustrating a method of generating and entering data into a scheduling map in accordance with the teachings of the present invention.

DETAILED DESCRIPTION

The invention relates to the field of industrial automation and process control systems. In various embodiments, the invention provides methods, systems and computer program products that optimize scheduling of parameter data retrieval from devices that are coupled with and controlled by a control system.

For the purposes of the below written description, the terms "field device", and "sensor(s)" may be used interchangeably and shall be understood as referring to a device or component that is configured to measure, monitor and/or control parameters corresponding to one or more assets, devices, components, tags, hardware, software or device parameters, within an industrial environment. Exemplary field devices, may include valves, valve actuators, switches, and transmitters (e.g. temperature, pressure, level, and flow sensors).

Figure 7:
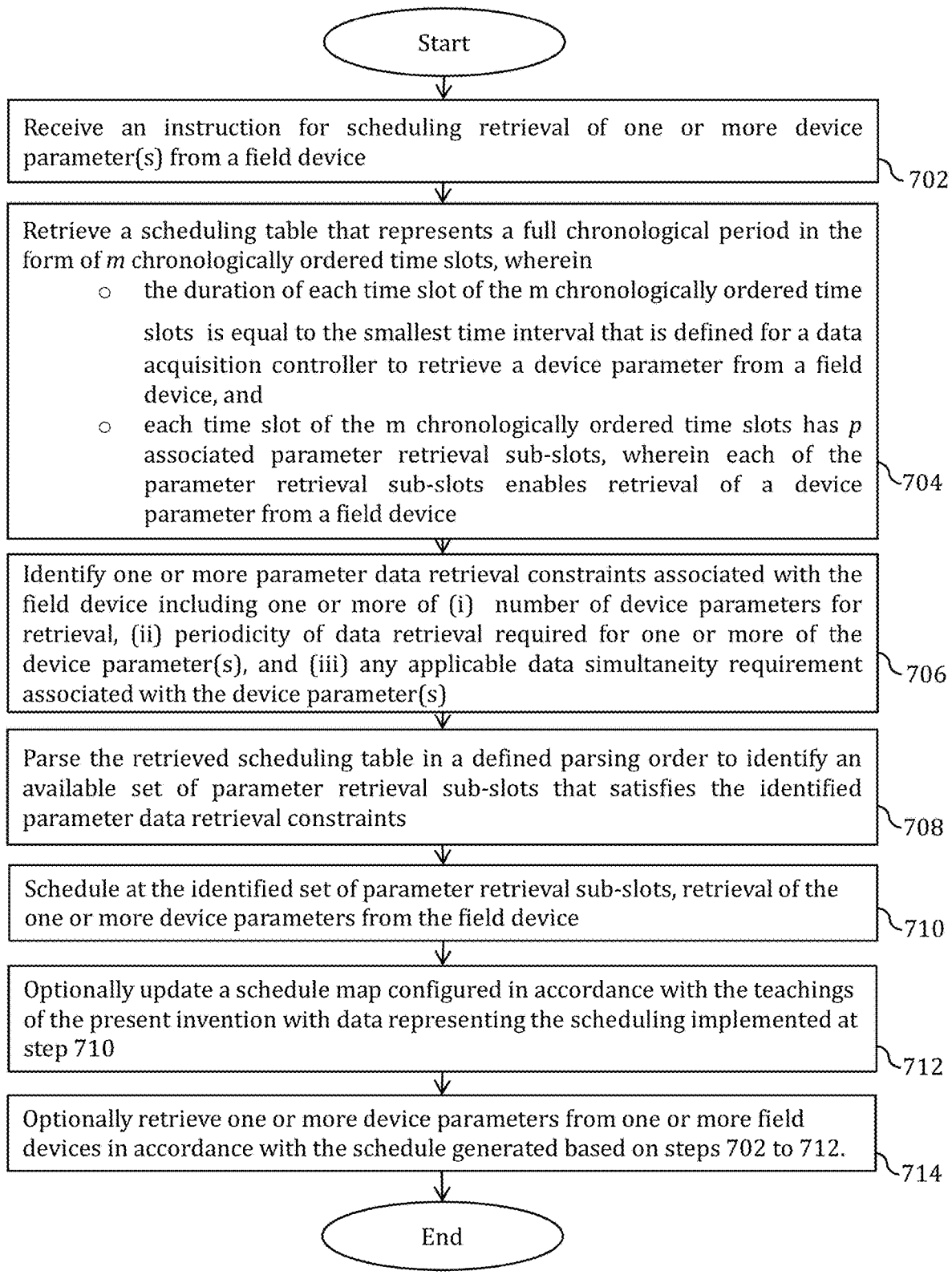
FIG. 7 illustrates a method of scheduling retrieval of one or more device parameter(s) from a field device, in accordance with the teachings of the present invention.

FIG. 7 illustrates a method of scheduling retrieval of one or more device parameter(s) from a field device, in accordance with the teachings of the present invention.

Figure 1:
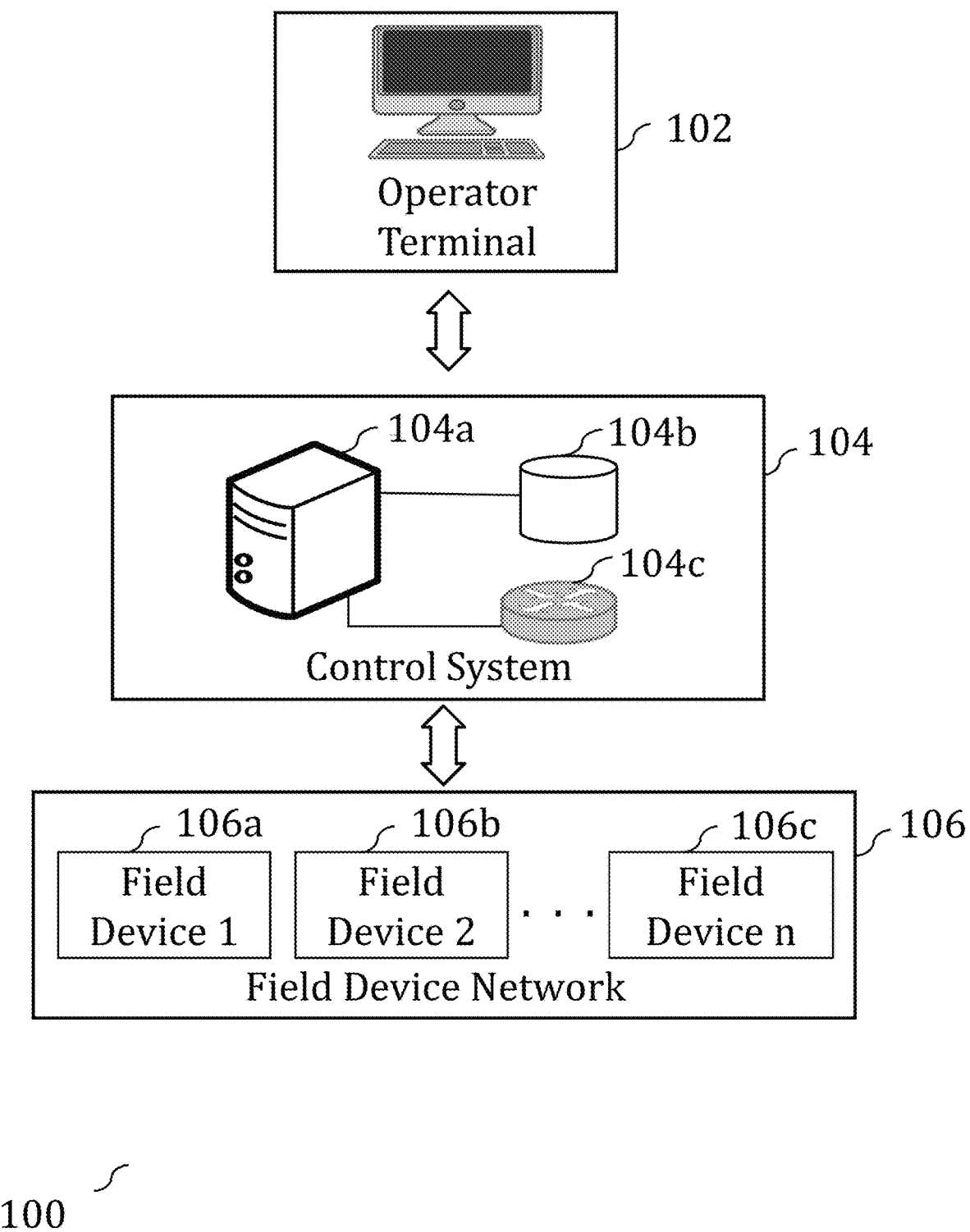
FIG. 1 illustrates a process control environment of a type that may be used for process control within an industrial environment.
Figure 2:
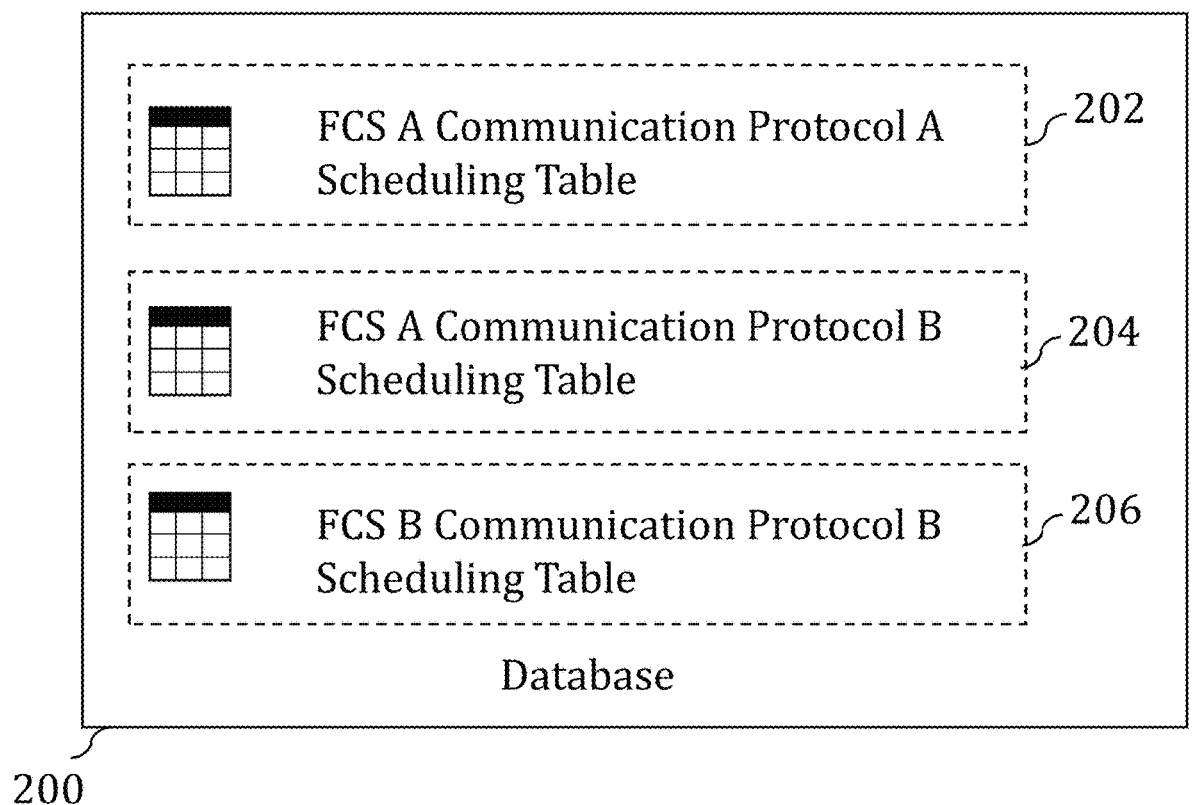
FIG. 2 illustrates an exemplary database of a kind that may be used by a control system configured to store one or more scheduling tables.
Figure 3:
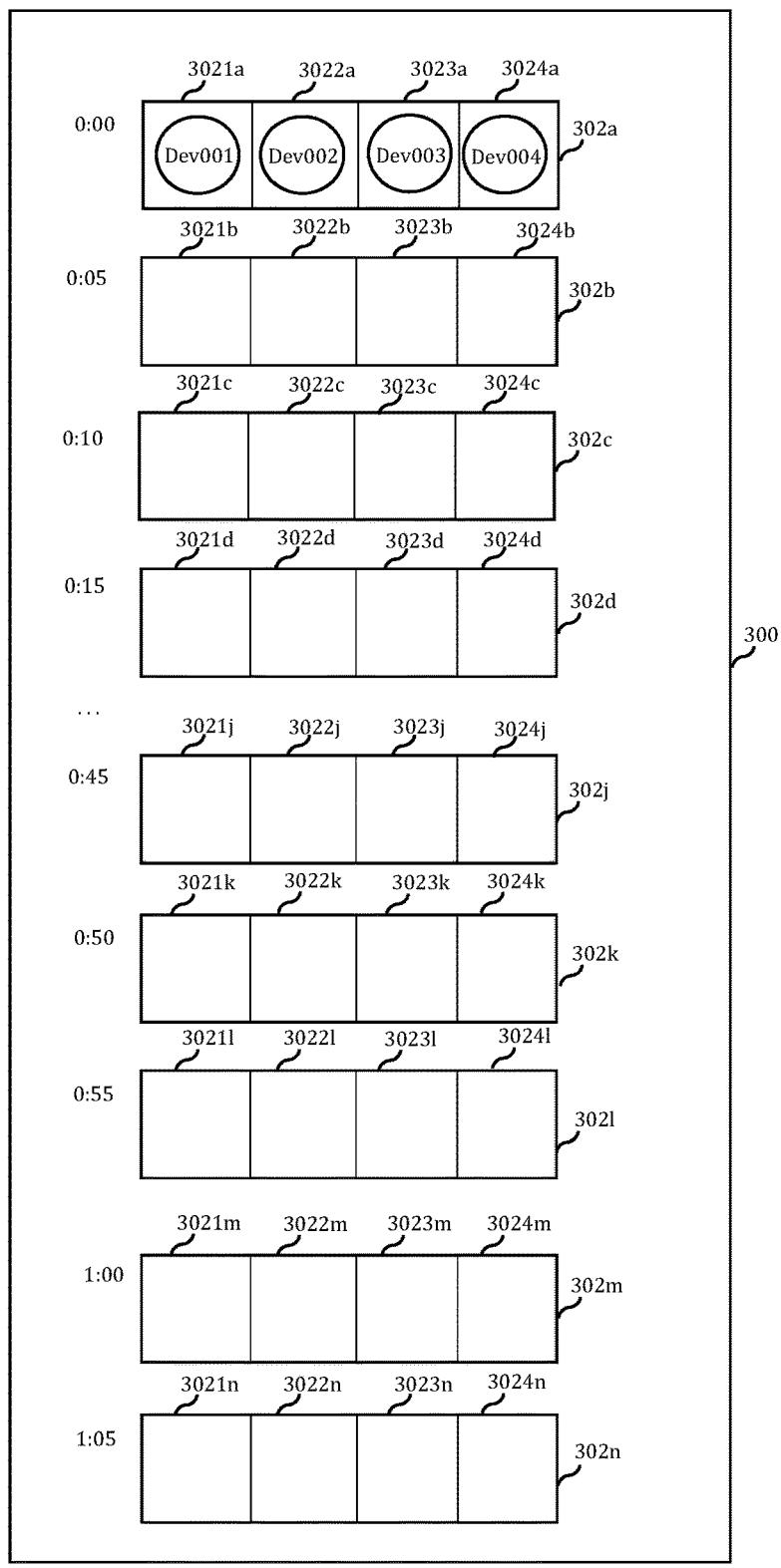
FIG. 3 illustrates a structure for an exemplary scheduling table.
Figure 4A:
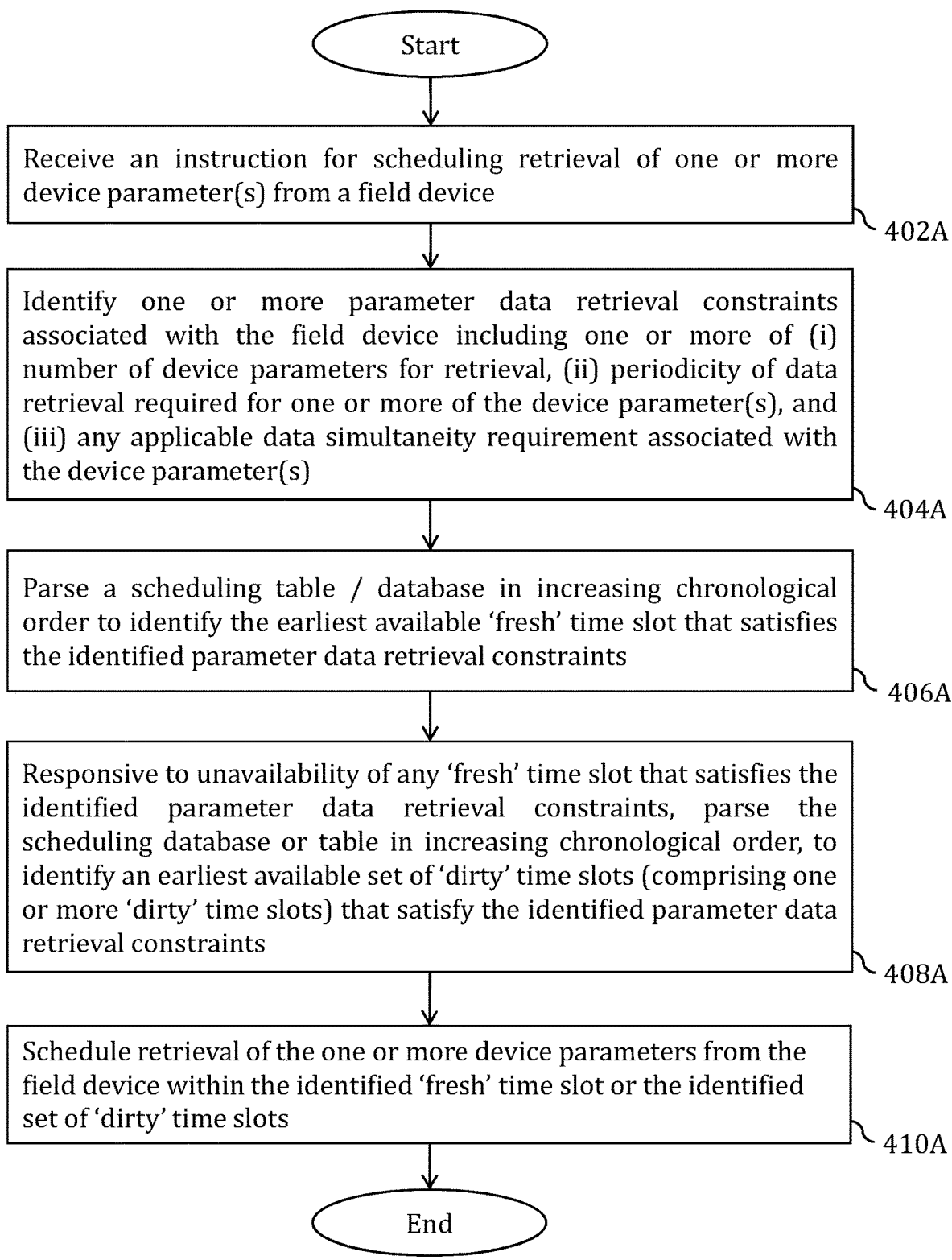
Figure 4B:
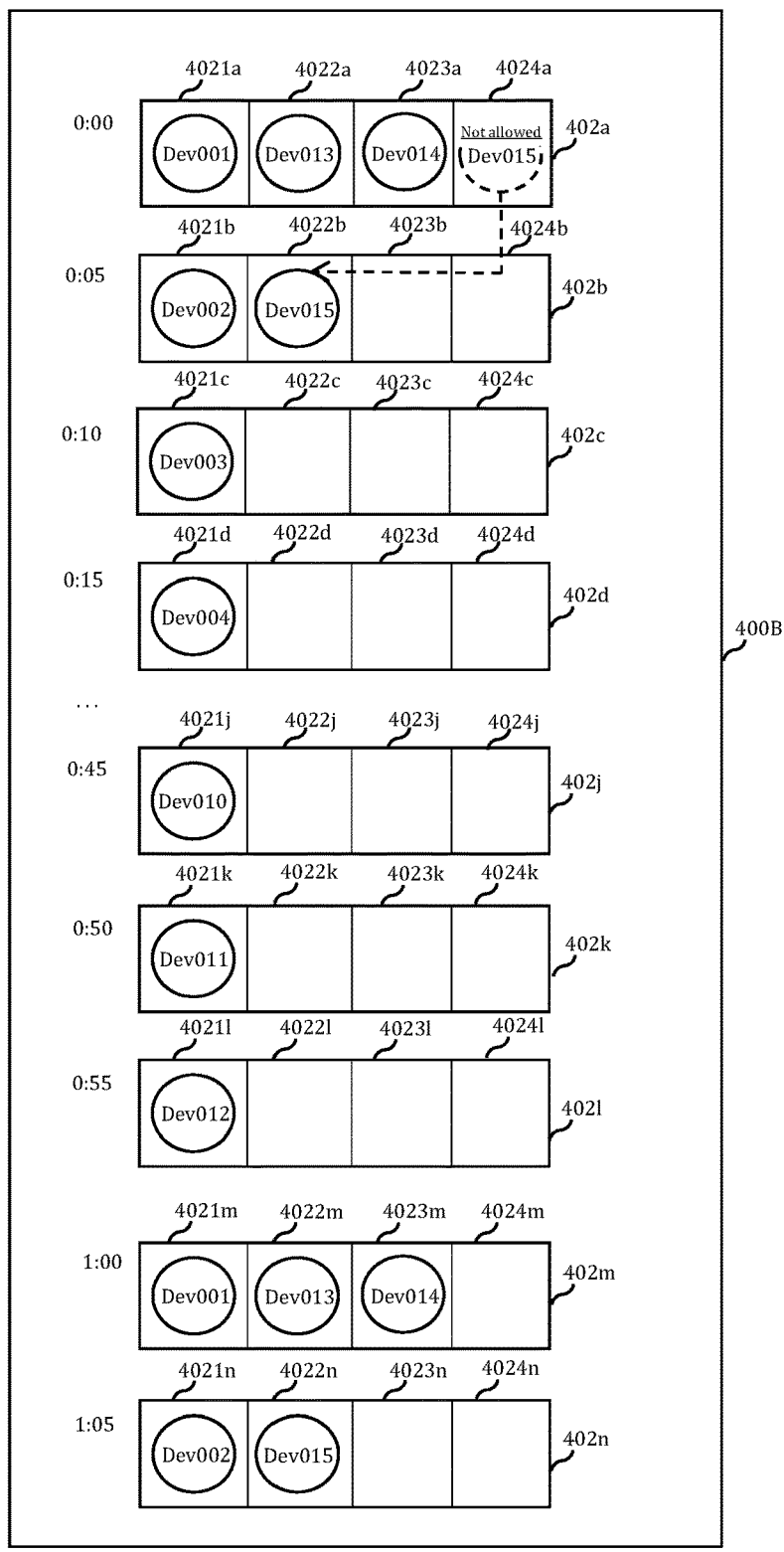

The method of FIG. 7 commences at step 702—which comprises receiving an instruction for scheduling retrieval of one or more device parameter(s) from a field device. The instruction may be received from a control system (of the kind illustrated in FIG. 1) or from a data acquisition controller (of a kind illustrated in FIG. 18), or from a control system operator.

Step 704 comprises retrieving a scheduling table that represents, in the form of m chronologically ordered time slots, a full chronological period that is covered by a scheduling method (or by a scheduling table), wherein (i) the duration of each time slot of the m chronologically ordered time slots is equal to the smallest time interval that is defined for a data acquisition controller to retrieve a device parameter from a field device, and (ii) each time slot of the m chronologically ordered time slots has p associated parameter retrieval sub-slots, wherein each of the parameter retrieval sub-slots enables retrieval of a device parameter from a field device.

So in an example, if (i) the full chronological period that is covered by a scheduling method or algorithm (or by a scheduling table) is a period of 24 hours, (ii) the duration of the smallest time interval that is defined for a data acquisition controller to retrieve a device parameter from a field device is 5 seconds, and (iii) each time slot has 8 associated parameter retrieval sub-slots—the retrieved scheduling table would accordingly represent the 24 hour period as being segmented into 17280 chronologically ordered time slots, which is calculated as 12*60*24 (i.e. 12 time slots of 5 second intervals per minute) aggregated over every 60 minute period within a full chronological period of 24 hours, each time slot having a duration of 5 seconds, and each of the 17280 time slots also having 8 parameter retrieval sub-slots available therewithin.

Step 706 comprises identifying one or more parameter data retrieval constraints associated with the field device under consideration. The one or more parameter data retrieval constraints may include any one or more of (i) a number of device parameters that require to be retrieved from the field device, (ii) periodicity of data retrieval required for each of the one or more of the device parameter(s), and (iii) any applicable data simultaneity requirement associated with the device parameter(s).

Thereafter, step 708 comprises parsing the retrieved scheduling table in a defined parsing order (according to the teachings of the present invention), to identify an available set of parameter retrieval sub-slots that satisfies the identified parameter data retrieval constraints. Specific methods for parsing the retrieved scheduling table in a defined parsing order and for identifying an available set of parameter retrieval sub-slots are described in more detail below, in connection with the methods of FIGS. 8 to 12.

Subsequent to identification of the available set of parameter retrieval sub-slots that satisfies the identified parameter data retrieval constraints, step 710 comprises, scheduling at the identified set of parameter retrieval sub-slots, retrieval of the one or more device parameters from the field device.

Step 712 comprises optionally updating (or generating and updating) a schedule map configured in accordance with the teachings of the present invention with data representing the scheduling that has been implemented at step 710. Specific methods of generating and updating a schedule map are described in more detail below, in connection with the methods of FIGS. 13 and 14.

Step 714 comprises optionally retrieving one or more device parameters corresponding to one or more field devices in accordance with the scheduling that has been implemented at steps 702 to 712. The one or more device parameters may be retrieved from the field device based on data communication between the field device and a control system or a data acquisition controller within the control system.

Figure 8:
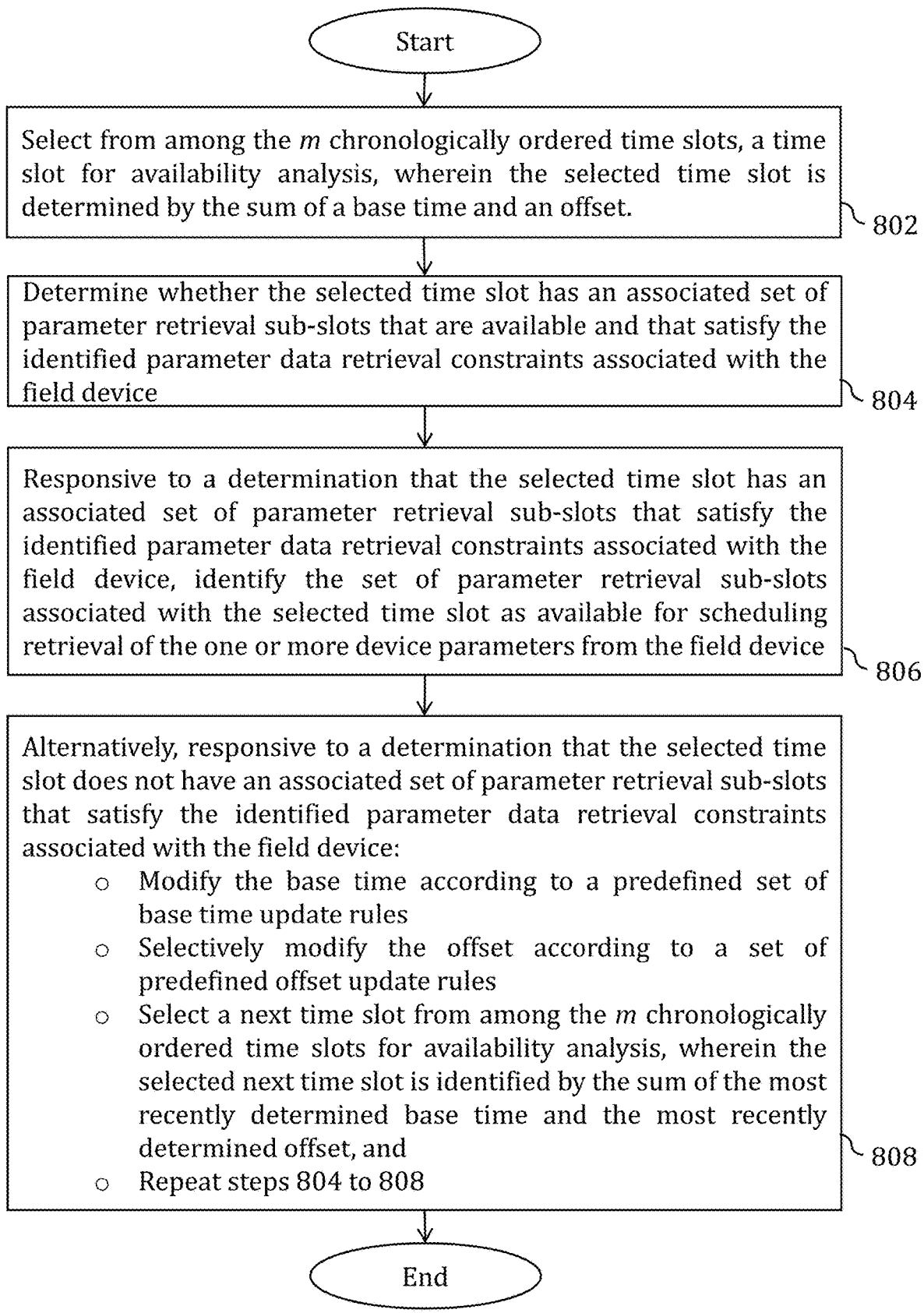
FIG. 8 is a flowchart illustrating a method for identifying a set of parameter retrieval sub-slots that are available and suitable for scheduling retrieval of one or more device parameters from a field device.

FIG. 8 is a flowchart illustrating a method for identifying a set of parameter retrieval sub-slots that are available and suitable for scheduling retrieval of one or more device parameters from a field device. The method of FIG. 8 may be used to implement step 708 of the method of FIG. 7.

Step 802 comprises selecting from among the m chronologically ordered time slots within a retrieved scheduling table, a time slot for availability analysis, wherein the selected time slot is determined by the sum of a base time and an offset. For example:

if a base time value is 0 second and an offset value is 0 second, the selected time slot would be the time slot corresponding to the time value 0 second (i.e. 0+0=0)

if a base time value is 60 seconds and an offset value is 0 second, the selected time slot would be the time slot corresponding to the time value 60 seconds (i.e. 60+0=60)

if a base time value is 60 seconds and an offset value is 15 seconds, the selected time slot would be the time slot corresponding to the time value 75 seconds (i.e. 60+15=75)

The manner in which a base time and an offset are determined for the purpose of selecting a time slot at step 802 is discussed in more detail in connection with the methods described hereinafter.

Step 804 comprises determining whether the selected time slot has an associated set of parameter retrieval sub-slots that are available (i.e. that are not already filled) and which satisfy the identified parameter data retrieval constraints associated with the field device.

Responsive to a determination that the selected time slot has an associated set of parameter retrieval sub-slots that are available and also satisfy the identified parameter data retrieval constraints associated with the field device, step 806 comprises identifying (or marking or recording) the set of parameter retrieval sub-slots associated with the selected time slot as available for scheduling retrieval of the one or more device parameters from the field device.

Alternatively, responsive to a determination that the selected time slot does not have an associated set of parameter retrieval sub-slots that satisfy the identified parameter data retrieval constraints associated with the field device, step 808 comprises (i) modify the base time according to a predefined set of base time update rules, (ii) selectively modifying the offset according to a set of predefined offset update rules, (iii) selecting a next time slot from among the m chronologically ordered time slots for availability analysis, wherein the selected next time slot is determined by the sum of the most recently determined base time and the most recently determined offset, and (iv) repeating steps 804 to 808 until a positive determination is received in accordance with step 806. The manner in which a base time and an offset are modified in accordance with step 808 purpose of selecting a time slot at step 802 is discussed in more detail in connection with the methods described hereinafter.

Figure 9:
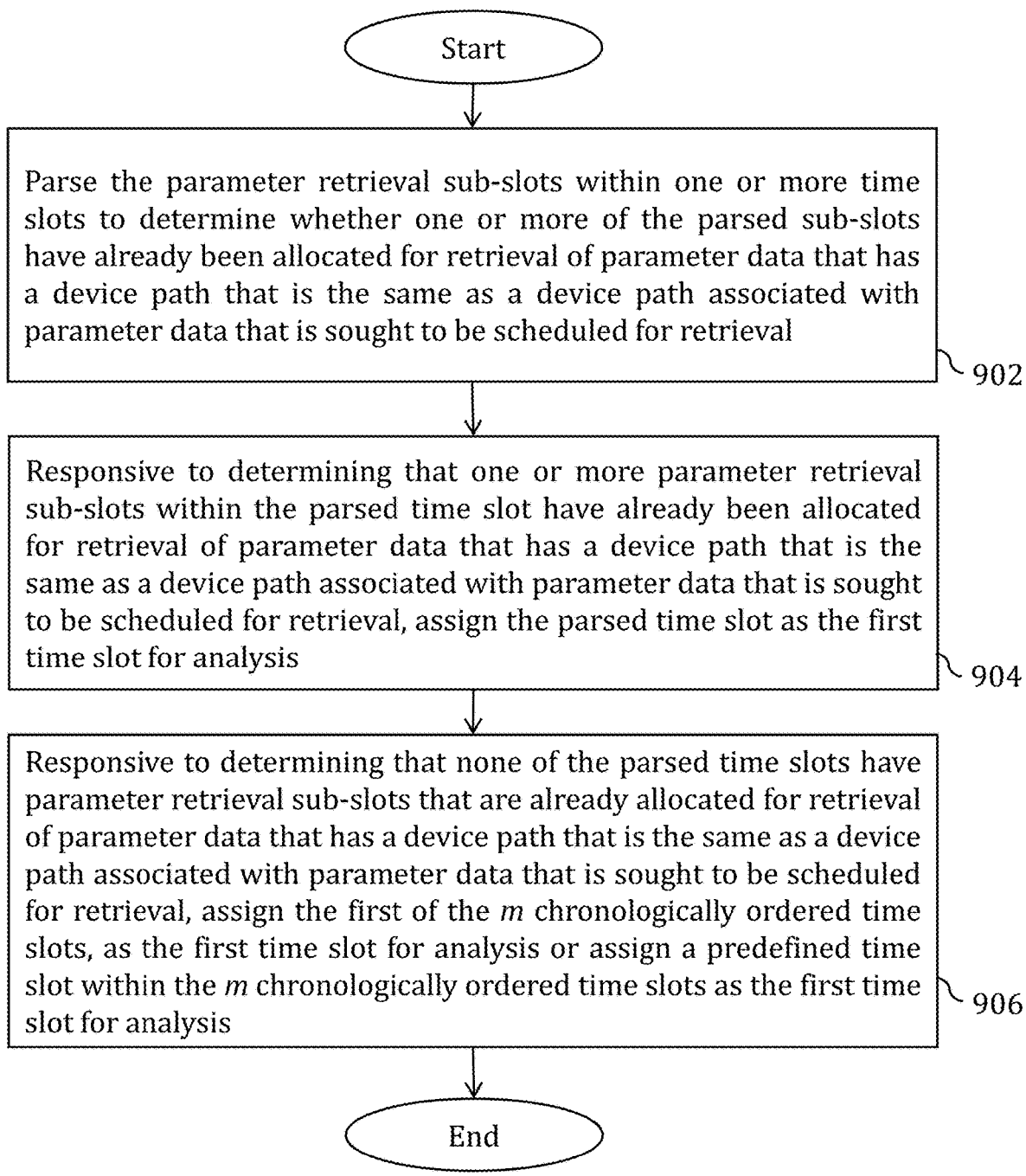
FIG. 9 is a flowchart illustrating a method for identifying a time slot from which to commence parsing of time slots for identifying a set of parameter retrieval sub-slots for retrieval of one or more device parameters.

FIG. 9 is a flowchart illustrating a method for identifying a time slot from which to commence parsing of time slots for retrieval of one or more device parameters. In an embodiment, the method of FIG. 9 may be implemented at step 802 of FIG. 8, for the purpose of selection of a first time slot for availability analysis in connection with retrieval scheduling of a set of device parameters.

Step 902 comprises parsing parameter retrieval sub-slots within one or more time slots of a retrieved scheduling table, to determine whether one or more sub-slots within each of the parsed time slots have already been allocated for retrieval of parameter data that has a device path identical to a device path associated with parameter data that is sought to be scheduled for retrieval.

Responsive to determining that one or more parameter retrieval sub-slots within a parsed time slot have already been allocated for retrieval of parameter data that has a device path that is identical to a device path associated with parameter data that is sought to be scheduled for retrieval, step 904 comprises assigning the parsed time slot as the first time slot for availability analysis.

Alternatively at step 906, responsive to determining that none of the parsed time slots have parameter retrieval sub-slots that are already allocated for retrieval of parameter data that has a device path that is identical to a device path associated with parameter data that is sought to be scheduled for retrieval, a first of the m chronologically ordered time slots, i.e. 0:00 time slot, is assigned as the first time slot for availability analysis. In another embodiment, at step 906, responsive to determining that none of the parsed time slots have parameter retrieval sub-slots that are already allocated for retrieval of parameter data that has a device path that is identical to a device path associated with parameter data that is sought to be scheduled for retrieval, a predefined time slot within the m chronologically ordered time slots is assigned as the first time slot for availability analysis.

The method of FIG. 9 enables a selection of base time for the very first time slot that is taken up for availability analysis in accordance with step 802 of FIG. 8, and this base time may thereafter be iteratively modified in accordance with the remaining steps of the method of FIG. 8.

Figure 10:
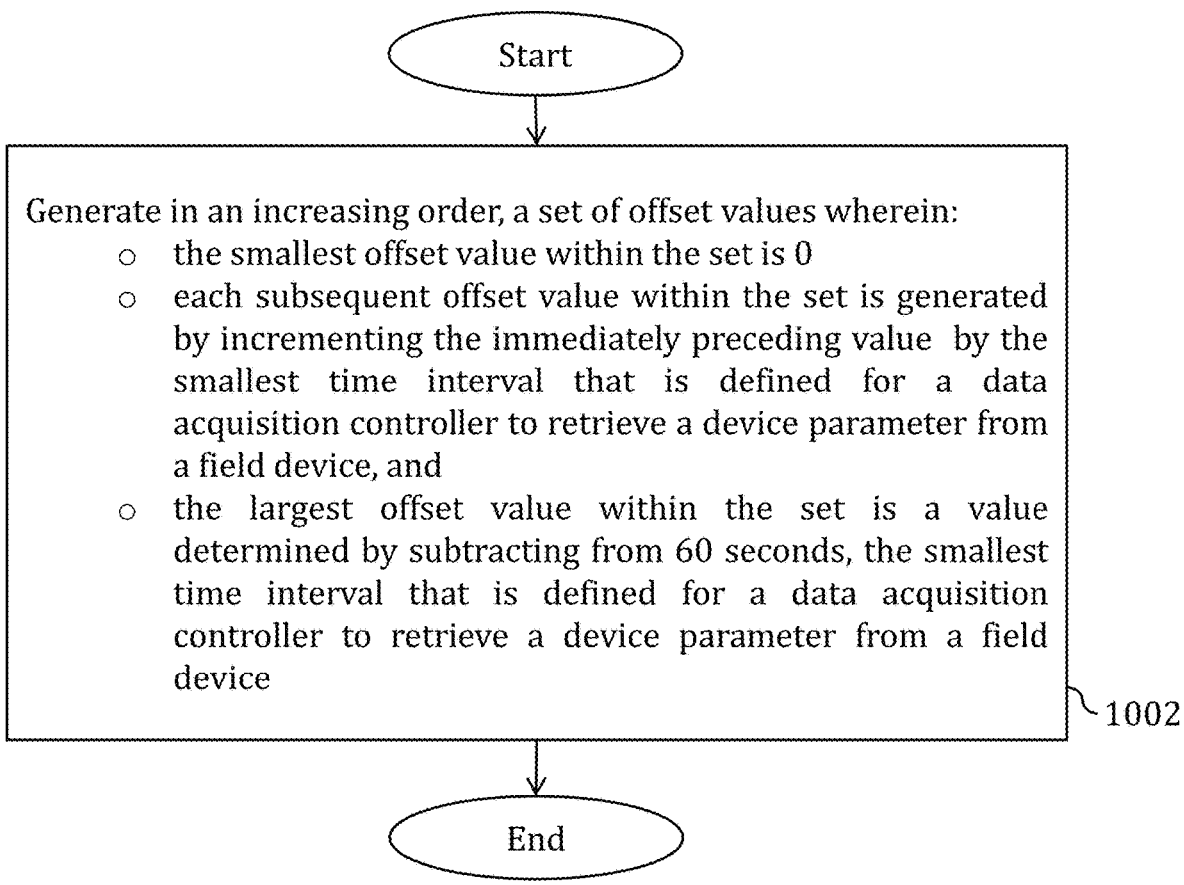
FIG. 10 is a flowchart illustrating a method of generating a set of offset values for use as an offset for the purposes of the method of FIG. 8.

FIG. 10 is a flowchart illustrating a method of generating a set of offset values for use as an offset for the purposes of the method of FIG. 8.

Step 1002 of the method comprises generating in an increasing order, a set of offset values wherein (i) the smallest offset value within the set is 0, (ii) each subsequent offset value within the set is generated by incrementing the immediately preceding value by the smallest time interval that is defined for a data acquisition controller to retrieve a device parameter from a field device, and (iii) the largest offset value within the set is a value determined by subtracting from 60 seconds, the smallest time interval that is defined for a data acquisition controller to retrieve a device parameter from a field device.

So for example, when the time interval that is defined for a data acquisition controller to retrieve a device parameter from a field device is 5 seconds, (i) the smallest offset value within the set is 0, (ii) the largest offset value within the set is 55 seconds (i.e. 60−5=55), and (ii) the full set of offset values would comprise the values {0, 5, 10, 15, 20, 25, 30, 35, 40, 45, 50, 55}.

The set of offset values that is generated in accordance with the method of FIG. 10 may be used for the purposes of selection and modification of offsets in accordance with the teachings of step 808 for the purposes of identifying a time slot for parsing and availability analysis.

Figure 11:
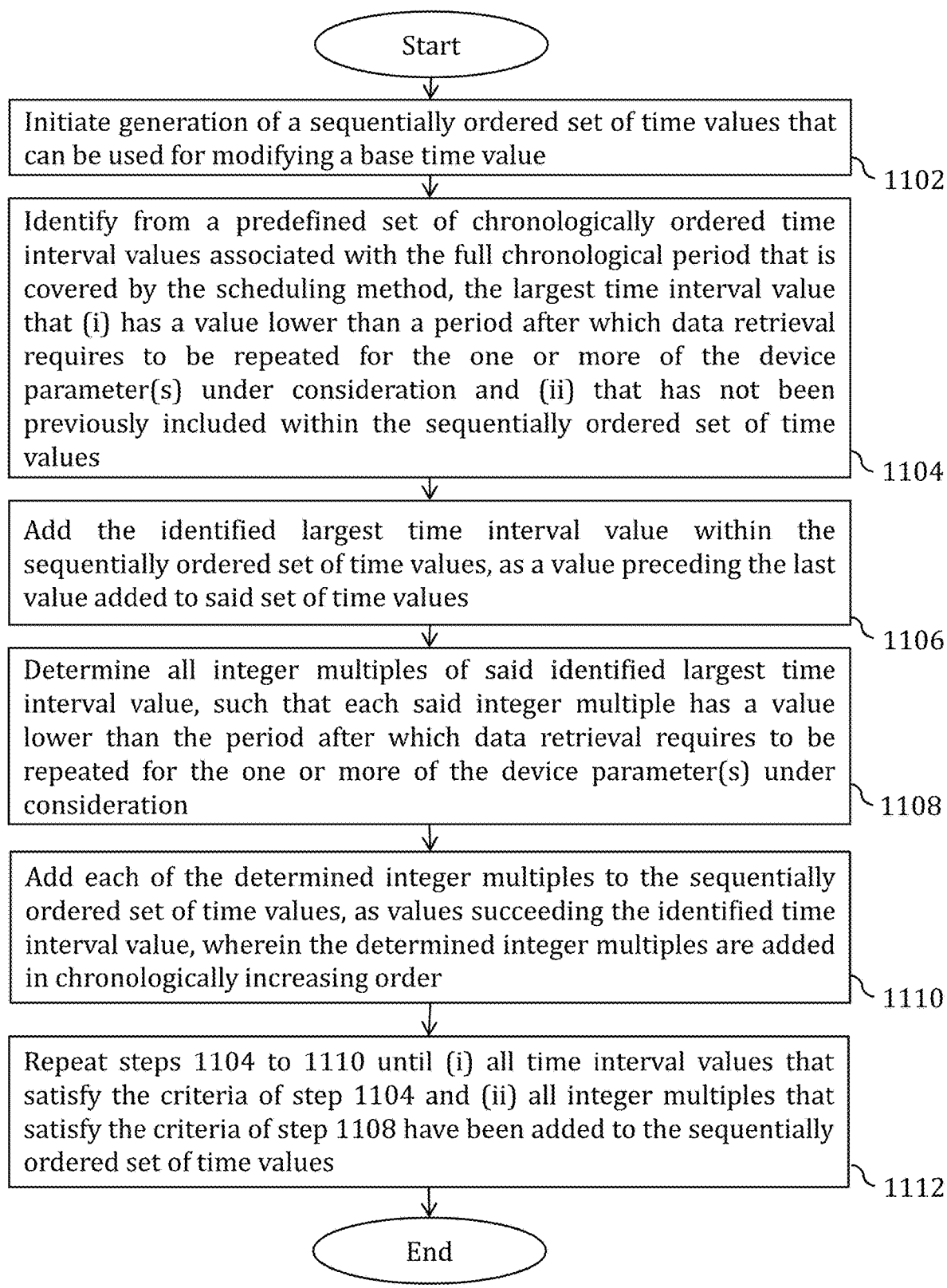
FIG. 11 is a flowchart illustrating a method of generating a sequentially ordered set of time values for use as a base time for the purposes of the method of FIG. 8.

FIG. 11 is a flowchart illustrating a method of generating a sequentially ordered set of time values for modifying a base time for the purposes of implementing the method of FIG. 8. Each device parameter may have a corresponding sequentially ordered set of time values for modifying a base time for the purposes of scheduling retrieval of such device parameter.

Step 1102 comprises initiating generation of a sequentially ordered set of time values that can be used for modifying a base time associated with a device parameter.

Step 1104 comprises identifying from a predefined set of chronologically ordered time interval values associated with the full chronological period that is covered by the scheduling method (or by a scheduling table), the largest time interval value that (i) has a value lower than a period after which data retrieval requires to be repeated for the device parameter under consideration and (ii) has not been previously included within the sequentially ordered set of time values.

The predefined set of chronologically ordered time interval values associated with the full chronological period that is covered by the scheduling method (or by a scheduling table) may comprise any set of chronologically ordered time interval values. For example, the predefined set of chronologically ordered time interval values associated with a 24 hour chronological period that is covered by the scheduling method (or by a scheduling table) may comprise the time interval values of {1 minute, 2 minutes, 3 minutes, 4 minutes, 5 minutes, 6 minutes, 10 minutes, 12 minutes, 15 minutes, 20 minutes, 30 minutes, 1 hour, 2 hours, 3 hours, 4 hours, 6 hours, 8 hours, 12 hours, 24 hours}, if in seconds, these time interval values would be {60, 120, 180, 240, 300, 360, 600, 720, 900, 1200, 1800, 3600, 7200, 10800, 14400, 21600, 28800, 43200, 86400}.

By way of example, taking the exemplary set of chronologically ordered time interval values disclosed above, and assuming a device parameter that has a periodicity of 1800 seconds, the largest time interval value that would be identified at step 1104 would be 1200 seconds—since 1200 seconds is the largest time interval which has a value lower than the period of 1800 seconds after which data retrieval requires to be repeated for the device parameter, and since 1200 seconds has also not been previously included within the sequentially ordered set of time values. By the same token, if a device parameter has a periodicity of 300 seconds, then the largest time interval value that would be identified at step 1104 would be 240 seconds, as 240 seconds is the largest time interval which has a value lower than the period of 300 seconds after which data retrieval requires to be repeated for the device parameter, and 240 seconds will be included within the sequentially ordered set of time values.

At step 1106, the identified largest time interval value is added within the sequentially ordered set of time values that is being generated through the method of FIG. 11, wherein the identified time interval value is added as a value immediately preceding the last value that has been added to said set of time values. If no previous value has been added to the sequentially ordered set of time values, then the time interval value identified at step 1104 is added as the first value. In the example under discussion, since the value of 1200 seconds is the first identified value, it is added as the first value within the sequentially ordered set of time values. In another scenario, if the identified largest time interval value, i.e. 1200 seconds, does not satisfy the parameter retrieval constraint(s), then the next largest time interval value 900 seconds within the predefined set of chronologically ordered time interval values, will be added into the sequentially ordered set of time values, thus the sequentially ordered set of time values will be {0, 900, 1200, 1800}.

Step 1108 comprises determining all integer multiples of the identified largest time interval value, such that each said integer multiple has a value lower than the period after which data retrieval requires to be repeated for the one or more of the device parameter(s) under consideration. In the example, under discussion, all integer multiples of the value 1200 exceed the device parameter periodicity value of 1800 seconds—and as a result no integer multiples would satisfy the conditions of step 1108. In another scenario, if the time interval value 900 seconds within the predefined set of chronologically ordered time interval values, is added into the sequentially ordered set of time values, but it does not satisfy the parameter retrieval constraint(s), then the next largest time interval value 720 seconds will be added into the sequentially ordered set of time values, but if it still does not satisfy the parameter retrieval constraint(s), then the integer multiples of 720 seconds, i.e. 1440 seconds will be added, so the sequentially ordered set of time values will still be {0, 720, 900, 1200, 1440, 1800}.

Step 1110 comprises adding each of the integer multiples that have been identified as satisfying the conditions of step 1108 to the sequentially ordered set of time values. The identified integer multiples are sequenced in chronologically increasing order, and are added as values immediately succeeding the last time interval value that has been added at step 1106.

Step 1112 comprises repeating steps 1104 to 1110 until (i) all time interval values (within the predefined set of chronologically ordered time interval values) that satisfy the criteria of step 1104 and (ii) all integer multiples that satisfy the criteria of step 1108, have been added to the sequentially ordered set of time values.

Figure 12:
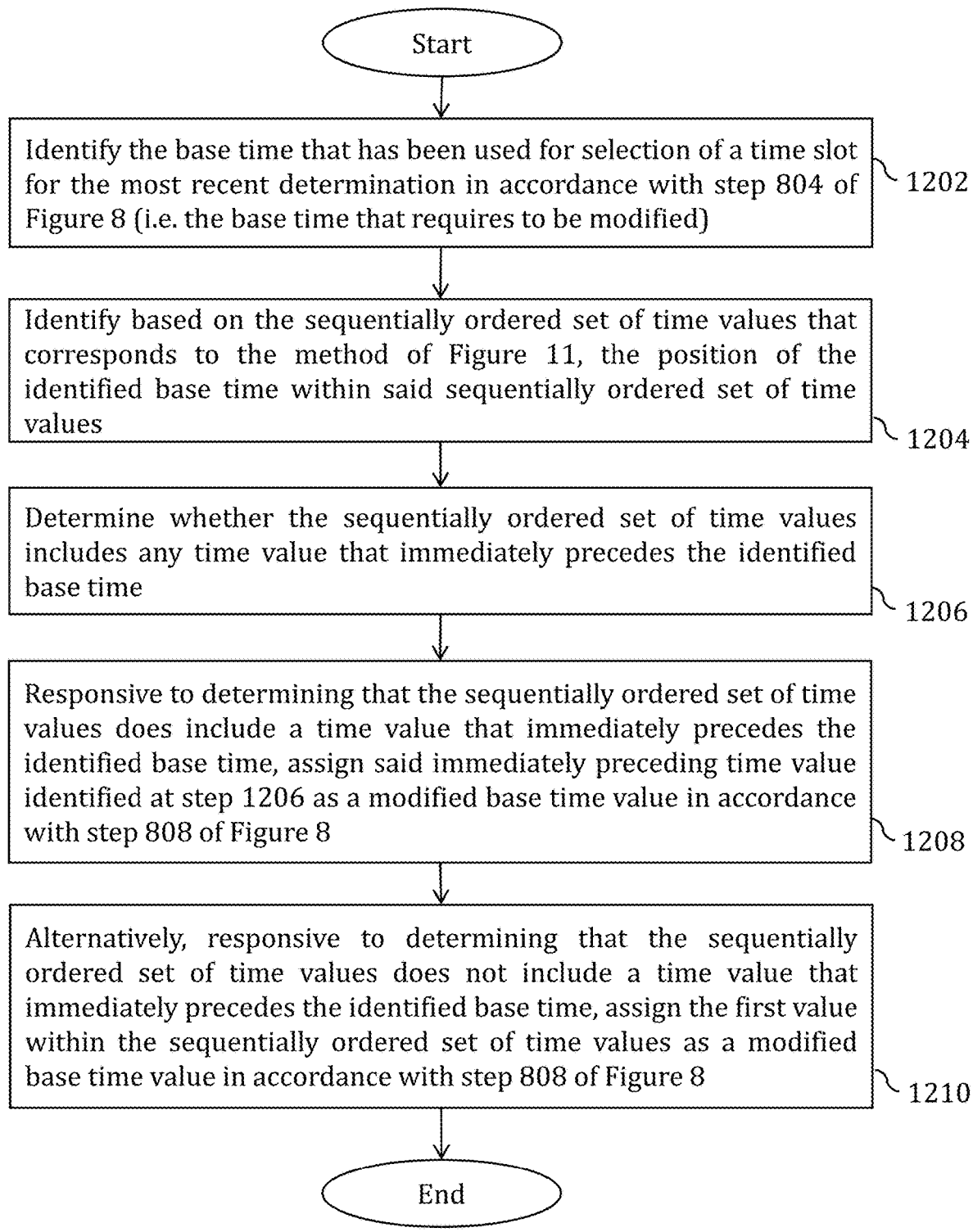
FIG. 12 is a flowchart illustrating a method of modifying a base time for the purposes of the method of FIG. 8.

FIG. 12 is a flowchart illustrating a method of modifying a base time for the purposes of implementing the method of FIG. 8. In an embodiment, the method of FIG. 12 may be implemented for the purposes of modifying a base time as provided for in step 808 of the method of FIG. 8.

The method of FIG. 12 commences at step 1202, which comprises identifying the base time that has been used for selection of a time slot for the most recent determination in accordance with step 804 of FIG. 8.

Step 1204 comprises identifying, based on the sequentially ordered set of time values that has been generated in accordance with the method of FIG. 11, the position or location of the identified base time within said sequentially ordered set of time values.

Step 1206 comprises determining whether the sequentially ordered set of time values includes any time value that immediately precedes the identified base time within the sequentially ordered set of time values.

At step 1208, responsive to determining that the sequentially ordered set of time values does include a time value that immediately precedes the identified base time, assign said immediately preceding time value identified at step 1206 as a modified base time value (as required in accordance with step 808 of FIG. 8).

Alternatively, responsive to determining that the sequentially ordered set of time values does not include a time value that immediately precedes the identified base time, step 1210 comprises assigning the first value, i.e. 0:00 within the sequentially ordered set of time values as a modified base time value (as required in accordance with step 808 of FIG. 8).

Figure 13:
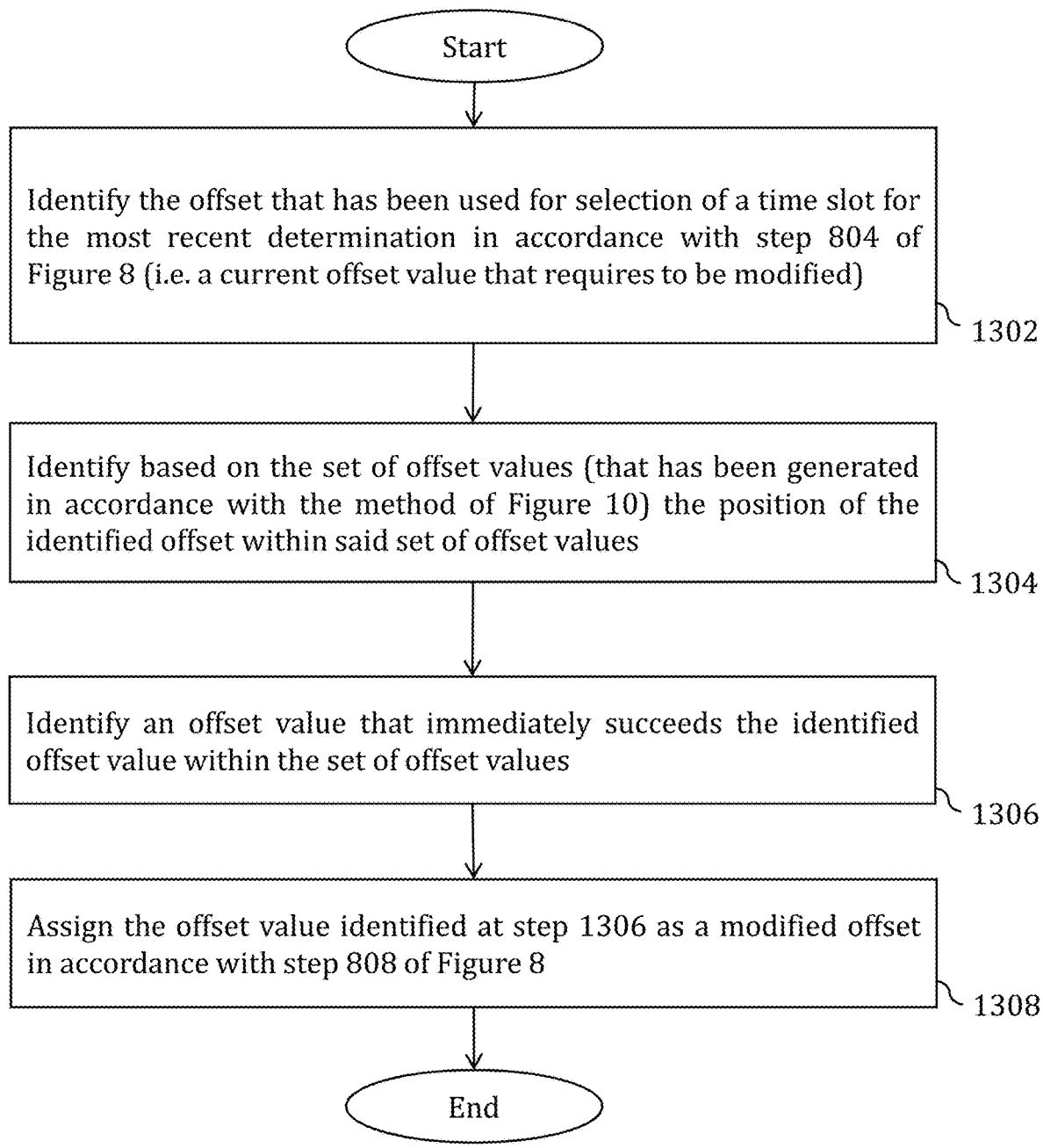
FIG. 13 is a flowchart illustrating a method of modifying an offset for the purposes of the method of FIG. 8.

FIG. 13 is a flowchart illustrating a method of modifying an offset for the purposes of the method of FIG. 8. In an embodiment, the method of FIG. 13 may be implemented for the purposes of modifying an offset as provided for in step 808 of the method of FIG. 8. The method of FIG. 13 (i.e. the selection modification of an offset) is implemented in response to a determination that a base time value, that has been most recently used for selection of a time slot for availability analysis, is the first value within the sequentially ordered set of time values (that has been generated in accordance with the method of FIG. 11).

Step 1302 comprises identifying an offset that has been used for selection of a time slot for the most recent determination that has been implemented in accordance with step 804 of FIG. 8 (i.e. a current offset value that requires to be modified).

Step 1304 comprises identifying, based on the set of offset values that have been ordered in an increasing order (that has been generated in accordance with the method of FIG. 10), the position of the identified offset within said set of offset values.

Step 1306 comprises identifying an offset value that immediately succeeds the identified offset value within the increasing ordered set of offset values.

Step 1308 comprises assigning the offset value identified at step 1306 as a modified offset in accordance with step 808 of FIG. 8.

By implementing one or more of the methods of FIGS. 7 to 13, the invention offers efficiencies and optimizations over methods known in the prior art—since the focus of the scheduling methods is no longer solely based on earliest found time slots and/or earliest found parameter retrieval sub-slots. Instead the methods of the present invention involves scheduling of parameter retrieval events within parameter retrieval sub-slots on a chronologically oscillating basis—involving performing availability analysis of later occurring parameter retrieval sub-slots first for a parameter retrieval event, and depending on the results of availability analysis, then scheduling the retrieval or moving to earlier occurring parameter retrieval sub-slots, then again depending on the results of availability analysis of earlier occurring parameter retrieval sub-slots, continuing to moving to next earlier occurring parameter retrieval sub-slots or moving back to another later occurring parameter retrieval sub-slots and so on. As a result of this oscillating approach, parameter retrieval events are spread evenly across the full chronological period that is covered by a scheduling method/algorithm (or by a scheduling table)—resulting in significantly reduced incidences of avoidable overflow errors.

Figure 5:
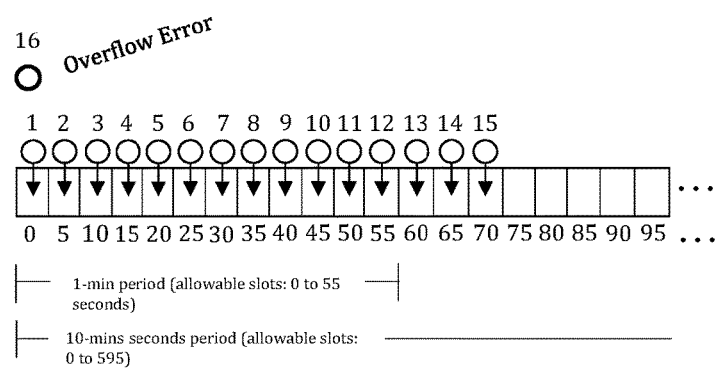
FIG. 5 illustrates drawbacks associated with prior art methods for scheduling parameter data retrieval from one or more field devices.
Figure 16:
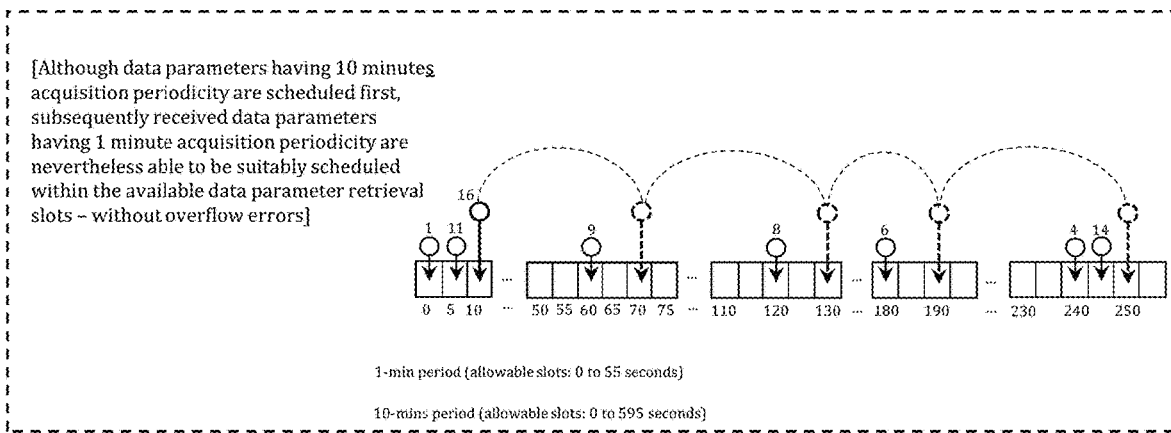
FIG. 16 illustrates advantages provided by methods of the present invention over prior art methods.

FIG. 16 illustrates this advantage over prior art methods (particularly when compared with the illustration of FIG. 5—which illustrates likely overflow errors that are observed in the prior art solutions). In the exemplary illustration of FIG. 16, implementing the teachings of the present invention have resulted in a spread-out distribution of parameter retrieval events across the full chronological period covered by the scheduling method/algorithm (or by a scheduling table)—thereby improving efficiencies and reducing the incidence of overflow errors. Specifically, all the fifteen parameters with 10 minutes periodicity are arranged in a spread-out manner, instead of simply assigned each parameter the earliest possible time slot, and as a result only two parameters, i.e. parameter 1 and parameter 11 are taking the time slots within the range of 0 to 55 seconds, so parameter 16 which having 1 min periodicity is able to be scheduled within its allowable timeslot, i.e. 0 to 55 seconds.

FIG. 14 is a flowchart illustrating a method of generating and entering data into a scheduling map in accordance with the teachings of the present invention. In an embodiment, the scheduling map generated and maintained in accordance with the method of FIG. 14 may be used for implementing the step of 712 of the method of FIG. 7.

Step 1402 comprises defining a table having a variable number of columns. The table comprises a plurality of rows and columns, wherein each row is assigned to a unique value corresponding to periodicity of data retrieval associated with one or more device parameters of one or more field devices (i.e. the 'parameter retrieval frequency'). Each row has a variable number of columns, such that (i) the number of columns assigned to a row is a value determined by dividing the unique value corresponding to periodicity of data retrieval for that row, by the smallest time interval that is defined for a data acquisition controller to retrieve a device parameter from a field device, (ii) each column represents a specific time slot within the full chronological period that is covered by the scheduling method/process (or by a scheduling table).

Each cell within the table that is defined by an intersection of a row and column within the table (i) is configured to store data representing a number of parameter retrieval sub-slots within a specific time slot, that have already been assigned for parameter data retrieval, or (ii) is alternatively configured to store data representing a number of parameter retrieval sub-slots, within a specific time slot that have not so far been assigned for parameter data retrieval (and which are therefore available for parameter data retrieval).

Responsive to scheduling of parameter retrieval (for a device parameter from a field device) within a parameter retrieval sub-slot in accordance with the teachings of the present invention (for example in accordance with step 710 of FIG. 7), step 1404 comprises:
 identifying a row corresponding to the parameter retrieval frequency for said device parameter/field device.
 within the identified row, incrementing (by one) the number of used parameter sub-slots at the time slot within which the parameter retrieval has been scheduled (or decrementing the number of available parameter sub-slots at the time slot within which the parameter retrieval has been scheduled)
 For each row that corresponds to a higher parameter retrieval frequency than the identified row (i) increment (by one) the number of used parameter sub-slots at the time slot within which the parameter retrieval has been scheduled (or decrement the number of available parameter sub-slots at the time slot within which the parameter retrieval has been scheduled), and incrementing (by one) the number of used parameter sub-slots at each column where the corresponding time slot represented by said column is capable of being represented as the sum of (a) a time value corresponding to the time slot within which the parameter retrieval has been scheduled and (b) an integer multiple of the 'parameter retrieval frequency' for the device parameter/field device.
 For each row that corresponds to a lower parameter retrieval frequency than the identified row (i) determining a time slot value 'x' that is the modulus of the time value corresponding to the time slot within which the parameter retrieval has been scheduled divided by said lower parameter retrieval frequency, (ii) incrementing (by one) the number of used parameter sub-slots at the time slot represented by time slot value 'x' (or decrementing the number of available parameter sub-slots at the time slot represented by time slot value 'x'), and (iii) incrementing (by one) the number of used parameter sub-slots at each time slot that has a value corresponding to the determined modulus (or decrementing the number of available parameter sub-slots within the time slot corresponding to the determined modulus value).

Figure 17:
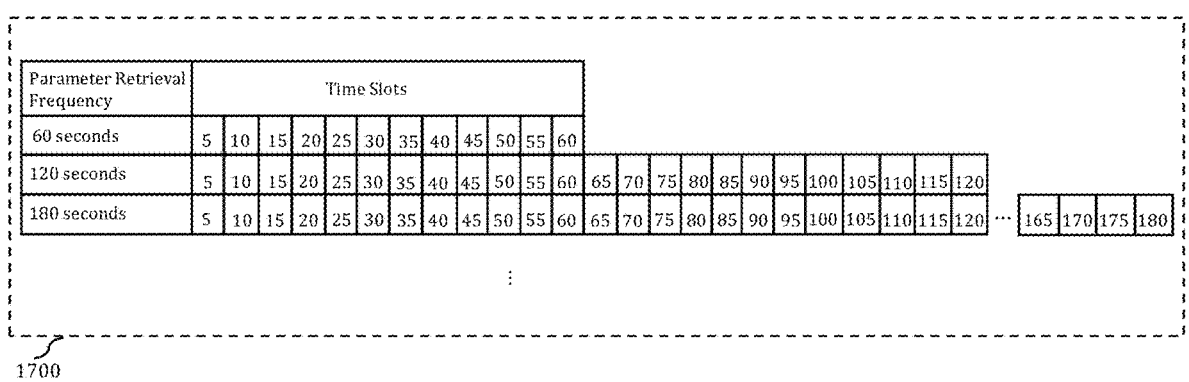
FIG. 17 illustrates an exemplary scheduling map generated in accordance with the teachings of FIG. 14.

FIG. 17 illustrates an exemplary scheduling map 1700 generated in accordance with the teachings of FIG. 14. While the illustration only shows the rows corresponding to parameter retrieval frequencies of 60, 120 and 180 seconds, it would be understood at all parameter retrieval frequencies within a full chronological period covered by the relevant scheduling method/algorithm/scheduling table (e.g. all parameter retrieval frequencies upto 24 hours) would be represented as separate rows within scheduling table 1700. The rows could have a variable number of columns, which is determined by dividing corresponding parameter retrieval frequencies (i.e. periodicity of data retrieval for that row), by the smallest time interval that is defined for a data acquisition controller to retrieve a device parameter from a field device, i.e. 5 seconds. For instance, the row of 60 seconds parameter retrieval frequencies will have 12 columns.

Figure 15:
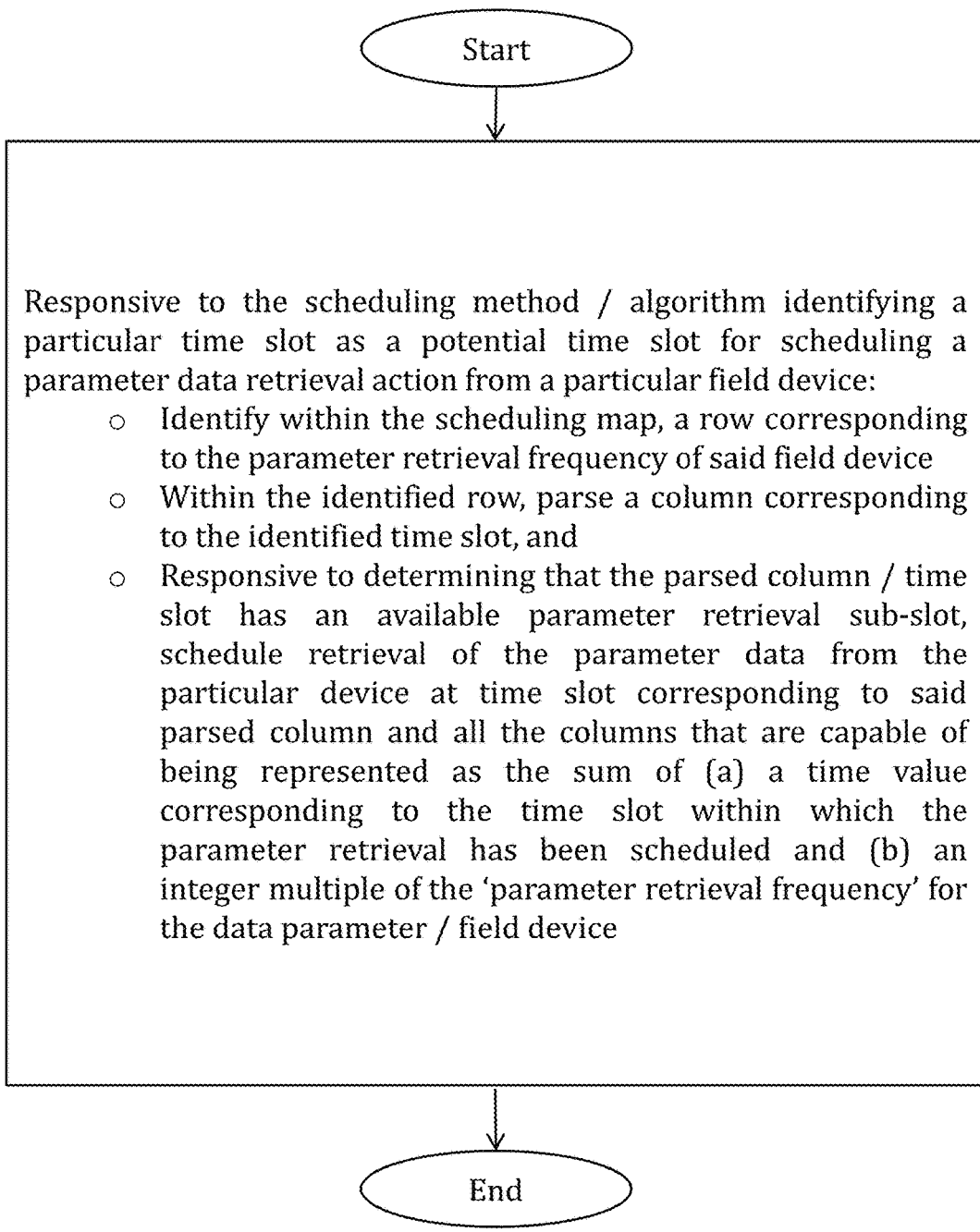
FIG. 15 is a flowchart illustrating a method of using a scheduling map of a type generated in accordance with the teachings of FIG. 14, for the purposes of scheduling retrieval of device parameters in accordance with the teachings of the present invention.

FIG. 15 is a flowchart illustrating a method of using a scheduling map of a type generated in accordance with the teachings of FIG. 14, for the purposes of scheduling retrieval of device parameters in accordance with the teachings of the present invention. In an embodiment, the method of FIG. 15 may be implemented for the purposes of implementing step 708 of the method of FIG. 7. In particular, when a suitable time-slot (and corresponding parameter retrieval sub-slot) is identified for scheduling a first iteration of parameter data retrieval corresponding to a device parameter, the method of FIG. 15 is implemented for ascertaining whether corresponding time-slots and parameter retrieval sub-slots are also available for each subsequent iteration of parameter data retrieval corresponding to the same device parameter in accordance with the relevant periodicity constraint(s).

Step 1502 comprises responding to identification (by a scheduling method/scheduling algorithm of the kind described in more detail above) of a particular time slot as a suitable time slot for scheduling a parameter data retrieval action from a particular field device, by:
 identifying within a scheduling map (of a kind generated and maintained in accordance with the teachings of the method of FIG. 14), a row corresponding to the parameter retrieval frequency of said device parameter/field device.
 Within the identified row, parsing a column corresponding to the identified time slot, and
 responsive to determining that the column/time slot that is parsed in accordance with step 1502 has an available parameter retrieval sub-slot, scheduling retrieval of the parameter data from the particular device at the identified potential time slot and all the columns that are capable of being represented as the sum of (i) a time value corresponding to the time slot within which the parameter retrieval has been scheduled and (ii) an integer multiple of the 'parameter retrieval frequency' for the device parameter/field device.

By implementing the method of FIG. 15, the invention eliminates the need for parsing all time slots and all parameter retrieval sub-slots within the full chronological period that is covered by the scheduling process (or by a scheduling table). The method of FIG. 15 has been found to result in significantly quicker and more efficient identification of suitable time slots within which device parameter retrieval can be scheduled—since the overall number of computational steps that require to be implemented when using the scheduling map of the present invention is significantly smaller than the number of computational steps that require to be implemented when following conventional methods.

Figure 18:
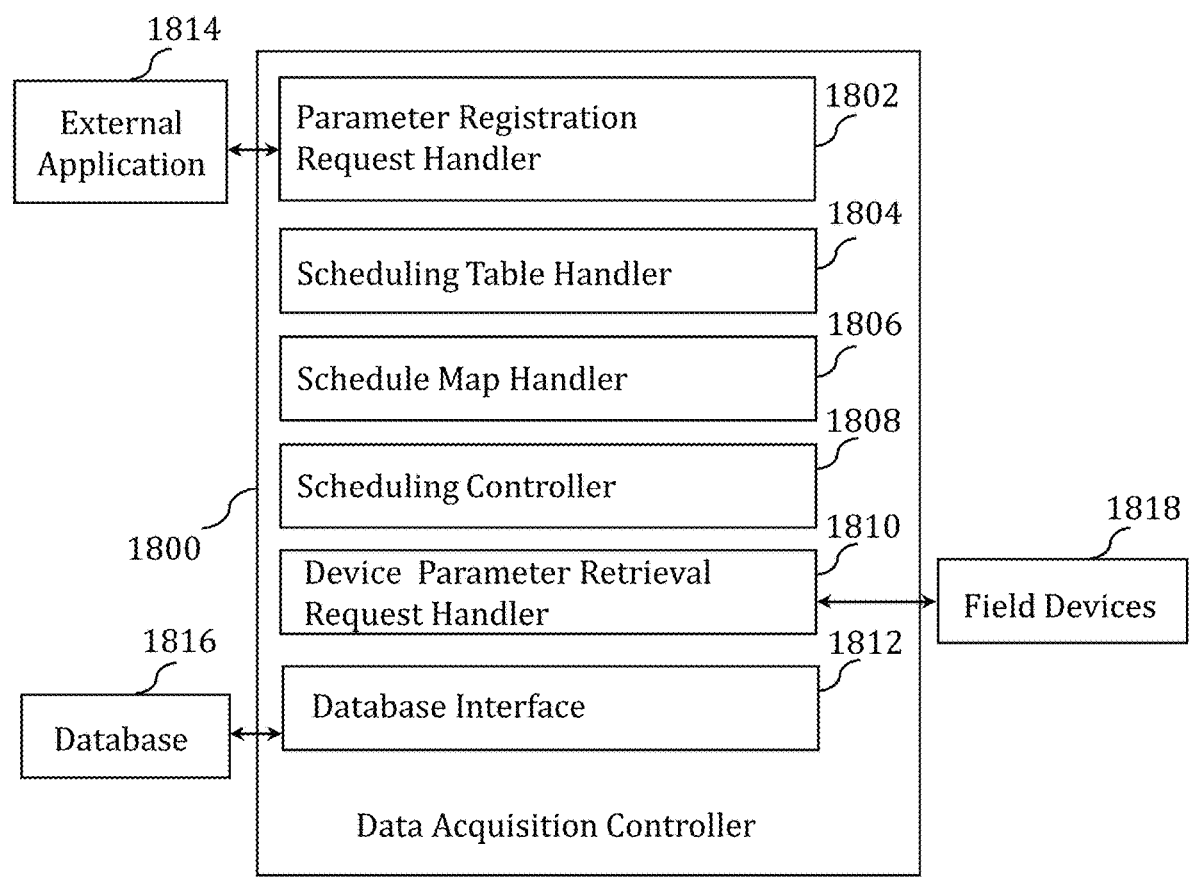
FIG. 18 illustrates an exemplary data acquisition controller that may be configured to implement the methods of the present invention.

FIG. 18 illustrates an exemplary data acquisition controller 1800 that may be configured to implement the methods of the present invention. In an embodiment, data acquisition controller 1800 is implemented within a control system 104 of the kind illustrated in FIG. 1.

Data acquisition controller 1800 may comprise a processor implemented controller and may additionally have implemented therewithin (i) a processor implemented parameter registration request handler 1802, (ii) a processor implemented scheduling table handler 1804, (iii) a processor implemented scheduling map handler 1806, (iv) a processor implemented scheduling controller 1808, (v) a processor implemented device parameter retrieval request handler 1810, and/or (vi) a processor implemented database interface 1812.

Parameter registration request handler 1802 is communicably interfaced with an external application (for example an external application through which an operator controls data acquisition controller 1800) and may be configured to receive inputs or instructions identifying device parameters corresponding to one or more field devices 1818 that require to be scheduled for parameter data retrieval in accordance with the methods of the present invention.

Scheduling table handler 1804 is a processor implemented handler configured for generating a scheduling table in accordance with the teachings of the present invention, and for modifying and updating the scheduling table in accordance with the methods disclosed hereinabove. In a particular embodiment, scheduling table handler 1804 may be configured to implement method step 710 of the method of FIG. 7.

Scheduling map handler 1806 is a processor implemented handler configured for generating a scheduling map in accordance with the teachings of the present invention, and for modifying and updating the scheduling map in accordance with the methods disclosed hereinabove. In a particular embodiment, scheduling map handler 1806 may be configured to implement the method steps of one or both of the methods of FIGS. 14 and 15.

Scheduling controller 1808 is a processor implemented controller configured for scheduling device parameter retrieval in accordance with the various teachings of the present invention. In particular embodiment, scheduling table handler 1804 may be configured to implement one or more or all of the method steps of any of FIGS. 7 to 13.

Device parameter retrieval request handler 1810 is a processor implemented handler configured for retrieving device parameters from one or more field devices 1818 in accordance with the scheduling table(s) and data retrieval methods described hereinabove. The device parameter retrieval request handler 1810 may be configured for communication with one or more field devices 1818 according to the one or more communication protocols specific to said field devices 1818.

Database interface 1812 is a processor implemented interface configured for storing data within and retrieving data from a database 1816. Database interface 1812 may be configured for storing and retrieving (within/from database 1816) any one or more of scheduling table data, scheduling map data, and parameter data that has been retrieved from one of more of the field devices 1818.

EXEMPLARY EMBODIMENTS

In an embodiment, the invention provides a method for scheduled parameter data retrieval from one or more field devices implemented within a process control environment. The method comprises (i) responding to an instruction for scheduling retrieval of a device parameter from a field device, by retrieving a scheduling table that represents a defined chronological period in the form of m chronologically ordered time slots, wherein (a) the duration of each time slot of the m chronologically ordered time slots is equal to a fixed time interval defined for retrieval of the device parameter from the field device, and (b) each time slot of the m chronologically ordered time slots has p associated parameter retrieval sub-slots, wherein each of the parameter retrieval sub-slots enables retrieval of one device parameter from the field device, (ii) identifying one or more parameter data retrieval constraints associated with the device parameter, (iii) parsing the retrieved scheduling table and identifying a set of available parameter retrieval sub-slots that satisfies the identified parameter data retrieval constraints, wherein parsing the retrieved scheduling table comprises (c) selecting from among the m chronologically ordered time slots, a first time slot for analysis, wherein the selected time slot is representable as a sum of a base time and an offset, (d) determining whether the selected time slot has an associated set of available parameter retrieval sub-slots that satisfy the identified parameter data retrieval constraints, (e) responsive to determining that the selected time slot does not have an associated set of available parameter retrieval sub-slots that satisfy the identified parameter data retrieval constraints (1) modifying the base time, (2) selectively modifying the offset, (3) selecting a next time slot from among the m chronologically ordered time slots for analysis, wherein the selected next time slot is determined by the sum of the modified base time and offset, and (f) repeating steps (c) to (f) until a selected time slot is determined as having an associated set of available parameter retrieval sub-slots that satisfy the identified parameter data retrieval constraints, and (iv) scheduling retrieval of the device parameter within the selected time slot, by recording within the scheduling table, data associating each parameter retrieval sub-slot within the identified set of parameter retrieval sub-slots with the device parameter from the field device.

In an embodiment of the method, the device parameter is retrieved from the field device by a data acquisition controller within a control system of the process control environment, based on the data recorded within the scheduling table.

In another method embodiment, responsive to receiving the instruction for scheduling retrieval of the device parameter from the field device, selection of a first time slot for analysis includes (i) parsing parameter retrieval sub-slots within one or more of the m chronologically ordered time slots to determine whether one or more of the parsed parameter retrieval sub-slots have already been allocated for retrieval of parameter data that has a first device path that is identical to a second device path associated with the device parameter of the field device, and (ii) responsive to determining that the first device path and second device path are identical, selecting as the first time slot, a time slot containing the parameter retrieval sub-slots that have already been allocated for retrieval of parameter data that has the first device path.

In a particular method embodiment, responsive to determining that the first device path and second device path are not identical, the method includes (i) selecting as the first time slot, the first of the m chronologically ordered time slots, or (ii) selecting as the first time slot, a predefined time slot within the m chronologically ordered time slots.

In one embodiment of the method, modifying the base time comprises (i) retrieving a sequentially ordered set of time values that have been generated for modifying base time, (ii) identifying the base time that requires modification, (iii) identifying within the retrieved sequentially ordered set of time values, a position of the identified base time that requires modification, and (iv) responsive to determining that the sequentially ordered set of time values includes a time value that immediately precedes the identified base time that requires modification, assigning said immediately preceding time value as a modified base time.

In a specific method embodiment, responsive to determining that the sequentially ordered set of time values does not include a time value that immediately precedes the identified base time that requires modification, the method includes assigning a first value from the sequentially ordered set of time values as the modified base time.

In a preferred embodiment of the method, the sequentially ordered set of time values is generated by (i) identifying from a predefined set of chronologically ordered time interval values associated with the defined chronological period that is represented by the scheduling table, a largest time interval value that (a) has a value lower than a parameter retrieval periodicity value associated with the device parameter, wherein the parameter retrieval periodicity value represents a defined period after which device parameter data retrieval requires to be repeated for the device parameter, and (b) has not been already included within the sequentially ordered set of time values, (ii) adding said identified largest time interval value, within the sequentially ordered set of time values, as a value preceding a time interval value that was most recently added to said sequentially ordered set of time values, (iii) determining all integer multiples of said identified largest time interval value, such that each said integer multiple has a value lower than the parameter retrieval periodicity value associated with the device parameter, (iv) adding each of the determined integer multiples to the sequentially ordered set of time values, as values succeeding the identified largest time interval value, wherein the determined integer multiples are added in chronologically increasing order, and (v) repeating steps (i) to (iv) until all time interval values that satisfy the requirements of step (i) have been added to the sequentially ordered set of time values, and all integer multiples that satisfy the requirements of step (iii) have been added to the sequentially ordered set of time values.

In one method embodiment, selectively modifying the offset comprises responding to a determination that a modified base time value that has been selected for identification of a next time slot for analysis, is a first value within the sequentially ordered set of time values, by implementing the steps of (i) identifying a current offset value, (ii) identifying based on a predefined set of offset values arranged in increasing order, a position of the identified current offset value within the predefined set of offset values, (iii) identifying an offset value that immediately succeeds the identified current offset value within the predefined set of offset values, and (iv) assigning said immediately succeeding offset value as a modified offset value.

In another method embodiment, the predefined set of offset values comprises a set of values arranged in increasing order such that (i) a smallest offset value within the set of values is 0, (ii) each subsequent offset value within the set is generated by incrementing the immediately preceding value by the fixed time interval defined for retrieval of the device parameter from the field device, and (iii) a largest offset value within the set of values is equal to a numerical difference between 60 seconds and the fixed time interval defined for retrieval of the device parameter from the field device.

In a method embodiment, following a determination that a selected time slot has an associated set of available parameter retrieval sub-slots that satisfy the identified parameter data retrieval constraints, the method includes the steps of (i) retrieving a scheduling map that stores data representing a number of used parameter retrieval sub-slots or a number of available parameter retrieval sub-slots corresponding to each of the m chronologically ordered time slots, wherein (a) the scheduling map is a variable column table comprising a plurality of rows and columns, (b) each row is assigned with a unique value representing a parameter retrieval periodicity value associated with the device parameter, wherein the parameter retrieval periodicity value represents a defined period after which device parameter data retrieval requires to be repeated for the device parameter, (c) each row has a variable number of columns, wherein (1) the number of columns assigned to a row is determined by dividing the unique value assigned to such row, by the fixed time interval defined for retrieval of the device parameter from the field device, and (2) each column represents a specific time slot within the defined chronological period, and (d) each cell corresponding to an intersection of a row and a column stores data representing a number of used parameter retrieval sub-slots or a number of available parameter retrieval sub-slots corresponding to a specific time slot, (ii) identifying within the retrieved scheduling map, a row corresponding to the parameter retrieval periodicity value associated with the device parameter, (iii) within the identified row, parsing a column corresponding to the selected time slot, and (iv) responsive to determining that the parsed column has an available parameter retrieval sub-slot, scheduling retrieval of the device parameter at the time slots represented by the parsed column and all the columns that are capable of being represented as a sum of (a) a time value corresponding to the selected time slot and (b) an integer multiple of the parameter retrieval periodicity value associated with the device parameter.

The method may further comprise responding to scheduling of retrieval of the device parameter at one or more time slots, by implementing the steps of (i) identifying a row corresponding to the parameter retrieval periodicity value associated with the device parameter, (ii) within the identified row, either (a) increment by one, the number of used parameter retrieval sub-slots associated with the time slot within which the device parameter has been scheduled for retrieval, or (b) decrement by one, the number of available parameter retrieval sub-slots associated with the time slot within which the device parameter has been scheduled for retrieval, (iii) for each row in the scheduling map that corresponds to a higher parameter retrieval periodicity value than the identified row either (c) increment by one, the number of used parameter retrieval sub-slots associated with the time slot within which the device parameter has been scheduled for retrieval, or (d) decrement by one, the number of available parameter retrieval sub-slots associated with the time slot within which the device parameter has been scheduled for retrieval, and either (e) increment by one, the number of used parameter retrieval sub-slots associated with each column where the corresponding time slot represented by said column is capable of being represented as the sum of (1) a time value corresponding to the time slot within which the device parameter has been scheduled for retrieval and (2) an integer multiple of the parameter retrieval periodicity value associated with the device parameter, or (f)

decrement by one, the number of available parameter retrieval sub-slots associated with each column where the corresponding time slot represented by said column is capable of being represented as the sum of (3) a time value corresponding to the time slot within which the device parameter has been scheduled for retrieval and (4) an integer multiple of the parameter retrieval periodicity value associated with the device parameter, (iv) for each row in the scheduling map that corresponds to a lower parameter retrieval periodicity value than the identified row (g) determine a modulus value 'x' by dividing (5) a time value corresponding to the time slot within which retrieval of the device parameter has been scheduled, by (6) said lower parameter retrieval periodicity value, either (7) increment by one, the number of used parameter retrieval sub-slots associated with the time slot corresponding to the determined modulus value 'x', or (8) decrement by one, the number of available parameter retrieval sub-slots associated with the time slot corresponding to the determined modulus value 'x', and either (9) increment by one, the number of used parameter retrieval sub-slots at each column corresponding to a time slot value that is the modulus of the sum of, a time value corresponding to the time slot within which the device parameter has been scheduled for retrieval, and an integer multiple of the parameter retrieval periodicity value associated with the device parameter, or (10) decrement by one, the number of available parameter retrieval sub-slots at each column corresponding to a time slot value that is the modulus of the sum of a time value corresponding to the time slot within which the device parameter has been scheduled for retrieval, and an integer multiple of the parameter retrieval periodicity value associated with the device parameter, provided the number of used parameter retrieval sub-slots or number of available parameter retrieval sub-slots has not been previously modified.

In an embodiment of the method the identified one or more parameter data retrieval constraints associated with the device parameter includes any of (i) number of device parameters for retrieval, (ii) periodicity of data retrieval required for the device parameter(s), and (iii) any applicable data simultaneity requirement associated with the device parameter.

The invention additionally provides a method of retrievably storing a scheduling map for enabling scheduled parameter data retrieval from one or more field devices implemented within a process control environment, the method comprising (i) generating a scheduling map configured to store data representing a number of used parameter retrieval sub-slots or a number of available parameter retrieval sub-slots corresponding to each of the m chronologically ordered time slots, wherein (a) the scheduling map is a variable column table comprising a plurality of rows and columns, (b) each row is assigned a unique value representing a parameter retrieval periodicity value associated with a device parameter corresponding to a field device, wherein the parameter retrieval periodicity value represents a defined period after which device parameter data retrieval requires to be repeated for the device parameter, (c) each row has a variable number of columns, wherein (1) the number of columns assigned to a row is determined by dividing the unique value assigned to such row, by the fixed time interval defined for retrieval of the device parameter from the field device, and (2) each column represents a specific time slot out of m chronologically ordered time slots that cumulatively represent a defined chronological period, and (c) each cell corresponding to an intersection of a row and a column stores data representing a number of used parameter retrieval sub-slots or a number of available parameter retrieval sub-slots corresponding to a specific time slot, and (ii) retrievably storing the generated scheduling map within a database that is communicably coupled with a data acquisition controller within a control system of a process control environment.

An embodiment of this method further comprises the steps of (i) identifying within the retrieved scheduling map, a row corresponding to the parameter retrieval periodicity value associated with the device parameter, (ii) within the identified row, parsing a column corresponding to a time slot selected for retrieval of the device parameter, and (iii) responsive to determining that the parsed column has an available parameter retrieval sub-slot, schedule retrieval of the device parameter at the time slots represented by the parsed column and all the columns that are capable of being represented as a sum of (a) a time value corresponding to the selected time slot and (b) an integer multiple of the parameter retrieval periodicity value associated with the device parameter.

In yet another embodiment, this method comprises responding to scheduling of retrieval of the device parameter at one or more time slots, by implementing the steps of (i) identifying a row corresponding to the parameter retrieval periodicity value associated with the device parameter, (ii) within the identified row, either (a) incrementing by one, the number of used parameter retrieval sub-slots associated with the time slot within which the device parameter has been scheduled for retrieval, or (b) decrementing by one, the number of available parameter retrieval sub-slots associated with the time slot within which the device parameter has been scheduled for retrieval, (iii) for each row in the scheduling map that corresponds to a higher parameter retrieval periodicity value than the identified row, either (c) incrementing by one, the number of used parameter retrieval sub-slots associated with the time slot within which the device parameter has been scheduled for retrieval, or (d) decrementing by one, the number of available parameter retrieval sub-slots associated with the time slot within which the device parameter has been scheduled for retrieval, and either (e) incrementing by one, the number of used parameter retrieval sub-slots associated with each column where the corresponding time slot represented by said column is capable of being represented as the sum of (1) a time value corresponding to the time slot within which the device parameter has been scheduled for retrieval and (2) an integer multiple of the parameter retrieval periodicity value associated with the device parameter, or (f) decrementing by one, the number of available parameter retrieval sub-slots associated with each column where the corresponding time slot represented by said column is capable of being represented as the sum of (3) a time value corresponding to the time slot within which the device parameter has been scheduled for retrieval and (4) an integer multiple of the parameter retrieval periodicity value associated with the device parameter, (iv) for each row in the scheduling map that corresponds to a lower parameter retrieval periodicity value than the identified row determine a modulus value 'x' by dividing (g) a time value corresponding to the time slot within which retrieval of the device parameter has been scheduled, by (h) said lower parameter retrieval periodicity value, (v) either increment by one, the number of used parameter retrieval sub-slots associated with the time slot corresponding to the determined modulus value 'x', or decrement by one, the number of available parameter retrieval sub-slots associated with the time slot corresponding to the determined modulus value 'x', and (vi) either increment by one, the number of used parameter retrieval sub-slots at each column corresponding to a time slot value that is the modulus of the sum of a time value corresponding to the time slot within which the device parameter has been scheduled for retrieval and an integer multiple of the parameter retrieval periodicity value associated with the device parameter, or (vii) decrement by one, the number of available parameter retrieval sub-slots at each column corresponding to a time slot value that is the modulus of the sum of a time value corresponding to the time slot within which the device parameter has been scheduled for retrieval, and an integer multiple of the parameter retrieval periodicity value associated with the device parameter, provided the number of used parameter retrieval sub-slots or number of available parameter retrieval sub-slots has not been modified before.

The invention additionally provides system embodiments, comprising a system configured for scheduled parameter data retrieval from one or more field devices implemented within a process control environment. The system comprises a processor implemented data acquisition controller configured for implementing any one or more method steps as described hereinabove.

Other system embodiments of the invention provide a system configured for retrievably storing a scheduling map for enabling scheduled parameter data retrieval from one or more field devices implemented within a process control environment—wherein said system may be configured for implementing any one or more method steps as described hereinabove.

The invention also provides a computer program product for scheduled parameter data retrieval from one or more field devices implemented within a process control environment. The computer program product comprising a non-transitory computer usable medium having a computer readable program code embodied therein, the computer readable program code comprising instructions for implementing within a processor based computing system, one or more method steps as described hereinabove.

Yet further, the invention provides a computer program product for retrievably storing a scheduling map for enabling scheduled parameter data retrieval from one or more field devices implemented within a process control environment. The computer program product comprising a non-transitory computer usable medium having a computer readable program code embodied therein, the computer readable program code comprising instructions for implementing within a processor based computing system, one or more method steps as described hereinabove.

Figure 19:
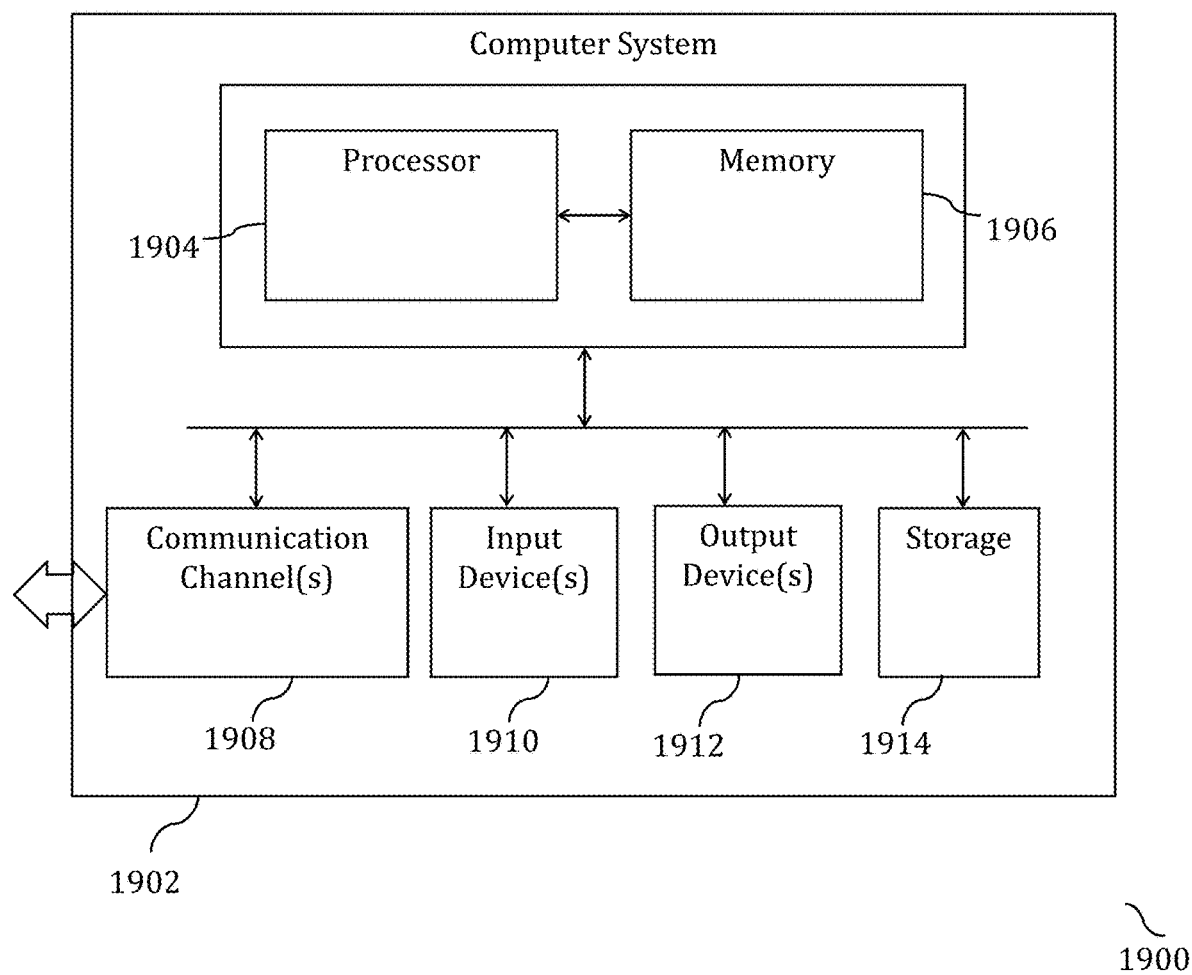
FIG. 19 illustrates an exemplary computer system according to which various embodiments of the present invention may be implemented.

FIG. 19 illustrates an exemplary computer system according to which various embodiments of the present invention may be implemented.

System 1900 includes computer system 1902 which in turn comprises one or more processors 1904 and at least one memory 1906. Processor 1904 is configured to execute program instructions—and may be a real processor or a virtual processor. It will be understood that computer system 1902 does not suggest any limitation as to scope of use or functionality of described embodiments. The computer system 1902 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1902 in accordance with the present invention may include one or more servers, desktops, laptops, tablets, smart phones, mobile phones, mobile communication devices, tablets, phablets and personal digital assistants. In an embodiment of the present invention, the memory 1906 may store software for implementing various embodiments of the present invention. The computer system 1902 may have additional components. For example, the computer system 1902 may include one or more communication channels 1908, one or more input devices 1910, one or more output devices 1912, and storage 1914. An interconnection mechanism (not shown) such as a bus, controller, or network, interconnects the components of the computer system 1902. In various embodiments of the present invention, operating system software (not shown) provides an operating environment for various software executing in the computer system 1902 using a processor 1904, and manages different functionalities of the components of the computer system 1902.

The communication channel(s) 1908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1910 may include, but is not limited to, a touch screen, a keyboard, mouse, pen, joystick, trackball, a voice device, a scanning device, or any another device that is capable of providing input to the computer system 1902. In an embodiment of the present invention, the input device(s) 1910 may be a sound card or similar device that accepts audio input in analog or digital form. The output device(s) 1912 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1902.

The storage 1914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1902. In various embodiments of the present invention, the storage 1914 may contain program instructions for implementing any of the described embodiments.

In an embodiment of the present invention, the computer system 1902 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1902. The method described herein is typically implemented as a computer program product, comprising a set of program instructions that is executed by the computer system 1902 or any other similar device. The set of program instructions may be a series of computer readable codes stored on a tangible medium, such as a computer readable storage medium (storage 1914), for example, diskette, CD-ROM, ROM, flash drives or hard disk, or transmittable to the computer system 1902, via a modem or other interface device, over either a tangible medium, including but not limited to optical or analogue communications channel(s) 1908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it will be understood that the present invention offers multiple advantages over the prior art system—by enabling scheduling of data parameter retrieval in a manner that utilizes parameter retrieval time slots and sub-slots more efficiently than prior art solutions, and by implementing optimized scheduling maps which enable faster and less computing resource intensive determinations about whether a parameter retrieval sub-slot is available across a full chronological period for each periodic iteration of retrieval of a specific data parameter. By implementing the present invention, the number of parameters that could be scheduled across a full chronological period could be maximized, and the scheduling capability for parameter retrieval has been significantly improved.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for scheduled parameter data retrieval from one or more field devices implemented within a process control environment, the method comprising:
   responding to an instruction for scheduling retrieval of a device parameter from a field device, by retrieving a scheduling table that represents a defined chronological period in the form of m chronologically ordered time slots, wherein:
      the duration of each time slot of them chronologically ordered time slots is equal to a fixed time interval defined for retrieval of the device parameter from the field device; and
      each time slot of the m chronologically ordered time slots has p associated parameter retrieval sub-slots, wherein each of the parameter retrieval sub-slots enables retrieval of one device parameter from the field device;
   identifying one or more parameter data retrieval constraints associated with the device parameter;
   parsing the retrieved scheduling table and identifying a set of available parameter retrieval sub-slots that satisfies the identified parameter data retrieval constraints, wherein parsing the retrieved scheduling table comprises:
      (i) selecting from among the m chronologically ordered time slots, a first time slot for analysis, wherein the selected first time slot is representable as a sum of a base time and an offset;
      (ii) determining whether the selected first time slot has an associated set of available parameter retrieval sub-slots that satisfy the identified parameter data retrieval constraints;
      (iii) responsive to determining that the selected first time slot does not have an associated set of available parameter retrieval sub-slots that satisfy the identified parameter data retrieval constraints:
         modifying the base time;
         selectively modifying the offset in response to modifying the base time;
         selecting a next time slot from among them chronologically ordered time slots for analysis, wherein the selected next time slot is determined by the sum of the modified base time and offset; and
      (iv) repeating steps (ii) to (iii) until a selected first time slot is determined as having an associated set of available parameter retrieval sub-slots that satisfy the identified parameter data retrieval constraints; and
   scheduling retrieval of the device parameter within the selected first time slot, by recording within the scheduling table, data associating each parameter retrieval sub-slot within the identified set of parameter retrieval sub-slots with the device parameter from the field device,
   wherein the device parameter is retrieved from the field device by a data acquisition controller based on the data recorded within the scheduling table, the data acquisition controller being within a control system of the process control environment, and
   wherein responsive to receiving the instruction for scheduling retrieval of the device parameter from the field device, selection of the first time slot for analysis includes:
      parsing parameter retrieval sub-slots within one or more of the m chronologically ordered time slots to determine whether one or more of the parsed parameter retrieval sub-slots have already been allocated for retrieval of parameter data that has a first device path that is identical to a second device path associated with the device parameter of the field device; and
      responsive to determining that the first device path and the second device path are identical, selecting as the selected first time slot, a time slot containing the parameter retrieval sub-slots that have already been allocated for retrieval of parameter data that has the first device path.

2. The method as claimed in claim 1, wherein responsive to determining that the first device path and the second device path are not identical, the method includes:
   selecting as the selected first time slot, the first of the m chronologically ordered time slots; or
   selecting as the selected first time slot, a predefined time slot within the m chronologically ordered time slots.

3. The method as claimed in claim 1, wherein modifying the base time comprises:
   retrieving a sequentially ordered set of time values that have been generated for modifying base time;
   identifying the base time that requires modification;
   identifying within the retrieved sequentially ordered set of time values, a position of the identified base time that requires modification; and
   responsive to determining that the sequentially ordered set of time values includes a time value that immediately precedes the identified base time that requires modification, assigning said immediately preceding time value as a modified base time.

4. The method as claimed in claim 3, wherein responsive to determining that the sequentially ordered set of time values does not include a time value that immediately precedes the identified base time that requires modification, the method includes assigning a first value from the sequentially ordered set of time values as the modified base time.

5. The method as claimed in claim 3, wherein the sequentially ordered set of time values is generated by:
(i) identifying from a predefined set of chronologically ordered time interval values associated with the defined chronological period that is represented by the scheduling table, a largest time interval value that:
   has a value lower than a parameter retrieval periodicity value associated with the device parameter, wherein the parameter retrieval periodicity value represents a defined period after which device parameter data retrieval requires to be repeated for the device parameter, and
   has not been already included within the sequentially ordered set of time values;
(ii) adding said identified largest time interval value, within the sequentially ordered set of time values, as a value preceding a time interval value that was most recently added to said sequentially ordered set of time values;
(iii) determining all integer multiples of said identified largest time interval value, such that each said integer multiple has a value lower than the parameter retrieval periodicity value associated with the device parameter;
(iv) adding each of the determined integer multiples to the sequentially ordered set of time values, as values succeeding the identified largest time interval value, wherein the determined integer multiples are added in chronologically increasing order; and
(v) repeating steps (i) to (iv) until:
   all time interval values that satisfy the requirements of step (i) have been added to the sequentially ordered set of time values; and
   and all integer multiples that satisfy the requirements of step (iii) have been added to the sequentially ordered set of time values.

6. The method as claimed in claim 3, wherein selectively modifying the offset in response to modifying the base time comprises responding to a determination that a modified base time value that has been selected for identification of a next time slot for analysis, is a first value within the sequentially ordered set of time values, by implementing the steps of:
identifying a current offset value;
identifying based on a predefined set of offset values arranged in increasing order, a position of the identified current offset value within the predefined set of offset values;
identifying an offset value that immediately succeeds the identified current offset value within the predefined set of offset values; and
assigning said immediately succeeding offset value as a modified offset value.

7. The method as claimed in claim 6, wherein the predefined set of offset values comprises a set of values arranged in increasing order such that:
a smallest offset value within the set of values is 0;
each subsequent offset value within the set is generated by incrementing the immediately preceding value by the fixed time interval defined for retrieval of the device parameter from the field device; and
a largest offset value within the set of values is equal to a numerical difference between 60 seconds and the fixed time interval defined for retrieval of the device parameter from the field device.

8. The method as claimed in claim 1, wherein following a determination that a selected first time slot has an associated set of available parameter retrieval sub-slots that satisfy the identified parameter data retrieval constraints, the method includes the steps of:
retrieving a scheduling map that stores data representing a number of used parameter retrieval sub-slots or a number of available parameter retrieval sub-slots corresponding to each of the m chronologically ordered time slots, wherein:
   the scheduling map is a variable column table comprising a plurality of rows and columns;
   each row is assigned with a unique value representing a parameter retrieval periodicity value associated with the device parameter, wherein the parameter retrieval periodicity value represents a defined period after which device parameter data retrieval requires to be repeated for the device parameter;
   each row has a variable number of columns, wherein (i) the number of columns assigned to a row is determined by dividing the unique value assigned to such row, by the fixed time interval defined for retrieval of the device parameter from the field device, and (ii) each column represents a specific time slot within the defined chronological period; and
   each cell corresponding to an intersection of a row and a column stores data representing a number of used parameter retrieval sub-slots or a number of available parameter retrieval sub-slots corresponding to a specific time slot;
identifying within the retrieved scheduling map, a row corresponding to the parameter retrieval periodicity value associated with the device parameter;
within the identified row, parsing a column corresponding to the selected first time slot; and
responsive to determining that the parsed column has an available parameter retrieval sub-slot, scheduling retrieval of the device parameter at the time slots represented by the parsed column and all the columns that are capable of being represented as a sum of (a) a time value corresponding to the selected first time slot and (b) an integer multiple of the parameter retrieval periodicity value associated with the device parameter.

9. The method as claimed in claim 8, further comprising responding to scheduling of retrieval of the device parameter at one or more time slots, by implementing the steps of:
within the identified row, either (i) increment by one, the number of used parameter retrieval sub-slots associated with the time slot within which the device parameter has been scheduled for retrieval, or (ii) decrement by one, the number of available parameter retrieval sub-slots associated with the time slot within which the device parameter has been scheduled for retrieval;
for each row in the scheduling map that corresponds to a higher parameter retrieval periodicity value than the identified row:
   either(i) increment by one, the number of used parameter retrieval sub-slots associated with the time slot within which the device parameter has been scheduled for retrieval, or (ii) decrement by one, the number of available parameter retrieval sub-slots associated with the time slot within which the device parameter has been scheduled for retrieval; and either (i) increment by one, the number of used parameter retrieval sub-slots associated with each column where the corresponding time slot represented by said column is capable of being represented as the sum of (a) a time value corresponding to the time slot within which the device parameter has been scheduled for retrieval and (b) an integer multiple of the parameter retrieval periodicity value associated with the device parameter, or (ii) decrement by one, the number of available parameter retrieval sub-slots associated with each column where the corresponding time slot represented by said column is capable of being represented as the sum of (a) a time value corresponding to the time slot within which the device parameter has been scheduled for retrieval and (b) an integer multiple of the parameter retrieval periodicity value associated with the device parameter; and for each row in the scheduling map that corresponds to a lower parameter retrieval periodicity value than the identified row:

determine a modulus value 'x' by dividing (i) a time value corresponding to the time slot within which retrieval of the device parameter has been scheduled, by (ii) said lower parameter retrieval periodicity value;

either (i) increment by one, the number of used parameter retrieval sub-slots associated with the time slot corresponding to the determined modulus value 'x', or (ii) decrement by one, the number of available parameter retrieval sub-slots associated with the time slot corresponding to the determined modulus value 'x'; and either (i) increment by one, the number of used parameter retrieval sub-slots at each column corresponding to a time slot value that is the modulus of the sum of (a) a time value corresponding to the time slot within which the device parameter has been scheduled for retrieval and (b) an integer multiple of the parameter retrieval periodicity value associated with the device parameter, or (ii) decrement by one, the number of available parameter retrieval sub-slots at each column corresponding to a time slot value that is the modulus of the sum of (a) a time value corresponding to the time slot within which the device parameter has been scheduled for retrieval and (b) an integer multiple of the parameter retrieval periodicity value associated with the device parameter, provided the number of used parameter retrieval sub-slots or number of available parameter retrieval sub-slots has not been previously modified.

10. The method as claimed in claim 1, wherein the identified one or more parameter data retrieval constraints associated with the device parameter include any of (i) number of device parameters for retrieval, (ii) periodicity of data retrieval required for the device parameter(s), and (iii) any applicable data simultaneity requirement associated with the device parameter.

11. A system configured for scheduled parameter data retrieval from one or more field devices implemented within a process control environment, the system comprising a processor implemented data acquisition controller configured for implementing the steps of:

responding to an instruction for scheduling retrieval of a device parameter from a field device, by retrieving a scheduling table that represents a defined chronological period in the form of m chronologically ordered time slots, wherein:

the duration of each time slot of the_m chronologically ordered time slots is equal to a fixed time interval defined for retrieval of the device parameter from the field device; and each time slot of the m chronologically ordered time slots has p associated parameter retrieval sub-slots, wherein each of the parameter retrieval sub-slots enables retrieval of one device parameter from the field device;

identifying one or more parameter data retrieval constraints associated with the device parameter;

parsing the retrieved scheduling table and identifying a set of available parameter retrieval sub-slots that satisfies the identified parameter data retrieval constraints, wherein parsing the retrieved scheduling table comprises:

(i) selecting from among the m chronologically ordered time slots, a first time slot for analysis, wherein the selected first time slot is representable as a sum of a base time and an offset;

(ii) determining whether the selected first time slot has an associated set of available parameter retrieval sub-slots that satisfy the identified parameter data retrieval constraints;

(iii) responsive to determining that the selected first time slot does not have an associated set of available parameter retrieval sub-slots that satisfy the identified parameter data retrieval constraints:

modifying the base time;

selectively modifying the offset in response to modifying the base time;

selecting a next time slot from among them chronologically ordered time slots for analysis, wherein the selected next time slot is determined by the sum of the modified base time and offset; and (iv) repeating steps (ii) to (iii) until a selected first time slot is determined as having an associated set of available parameter retrieval sub-slots that satisfy the identified parameter data retrieval constraints; and scheduling retrieval of the device parameter within the selected first time slot, by recording within the scheduling table, data associating each parameter retrieval sub-slot within the identified set of parameter retrieval sub-slots with the device parameter from the field device, wherein the data acquisition controller is configured to retrieve the device parameter from the field device, based on the data recorded within the scheduling table, and wherein the data acquisition controller is configured such that, responsive to receiving the instruction for scheduling retrieval of the device parameter from the field device, selection of the first time slot for analysis includes:

parsing parameter retrieval sub-slots within one or more of the m chronologically ordered time slots to determine whether one or more of the parsed parameter retrieval sub-slots have already been allocated for retrieval of parameter data that has a first device path that is identical to a second device path associated with the device parameter of the field device; and responsive to determining that the first device path and the second device path are identical, select as the selected first time slot, a time slot containing the parameter retrieval sub-slots that have already been allocated for retrieval of parameter data that has the first device path.

12. The system as claimed in claim 11, wherein responsive to determining that the first device path and the second device path are not identical, the data acquisition controllers configured for:
    selecting as the selected first time slot, the first of the m chronologically ordered time slots; or
    selecting as the selected first time slot, a predefined time slot within the m chronologically ordered time slots.

13. The system as claimed in claim 11, wherein the data acquisition controller is configured such that, modifying the base time comprises:
    retrieving a sequentially ordered set of time values that have been generated for modifying base time;
    identifying the base time that requires modification;
    identifying within the retrieved sequentially ordered set of time values, a position of the identified base time that requires modification; and
    responsive to determining that the sequentially ordered set of time values includes a time value that immediately precedes the identified base time that requires modification, assigning said immediately preceding time value as a modified base time.

14. The system as claimed in claim 13, wherein the data acquisition controller is configured to respond to determining that the sequentially ordered set of time values does not include a time value that immediately precedes the identified base time that requires modification, by assigning a first value from the sequentially ordered set of time values as the modified base time.

15. The system as claimed in claim 13, wherein the data acquisition controller is configured to generate the sequentially ordered set of time values by:
    (i) identifying from a predefined set of chronologically ordered time interval values associated with the defined chronological period that is represented by the scheduling table, a largest time interval value that:
        has a value lower than a parameter retrieval periodicity value associated with the device parameter, wherein the parameter retrieval periodicity value represents a defined period after which device parameter data retrieval requires to be repeated for the device parameter, and
        has not been already included within the sequentially ordered set of time values;
    (ii) adding said identified largest time interval value, within the sequentially ordered set of time values, as a value preceding a time interval value that was most recently added to said sequentially ordered set of time values;
    (iii) determining all integer multiples of said identified largest time interval value, such that each said integer multiple has a value lower than the parameter retrieval periodicity value associated with the device parameter;
    (iv) adding each of the determined integer multiples to the sequentially ordered set of time values, as values succeeding the identified largest time interval value, wherein the determined integer multiples are added in chronologically increasing order; and
    (v) repeating steps (i) to (iv) until:
        all time interval values that satisfy the requirements of step (i) have been added to the sequentially ordered set of time values; and
        and all integer multiples that satisfy the requirements of step (iii) have been added to the sequentially ordered set of time values.

16. The system as claimed in claim 13, wherein the data acquisition controller is configured such that selectively modifying the offset in response to modifying the base time comprises responding to a determination that a modified base time value that has been selected for identification of a next time slot for analysis, is a first value within the sequentially ordered set of time values, by implementing the steps of:
    identifying a current offset value;
    identifying based on a predefined set of offset values arranged in increasing order, a position of the identified current offset value within the predefined set of offset values;
    identifying an offset value that immediately succeeds the identified current offset value within the predefined set of offset values; and
    assigning said immediately succeeding offset value as a modified offset value.

17. The system as claimed in claim 16, wherein thew data acquisition controller is configured such that the predefined set of offset values comprises a set of values arranged in increasing order such that:
    a smallest offset value within the set of values is 0;
    each subsequent offset value within the set is generated by incrementing the immediately preceding value by the fixed time interval defined for retrieval of the device parameter from the field device; and
    a largest offset value within the set of values is equal to a numerical difference between 60 seconds and the fixed time interval defined for retrieval of the device parameter from the field device.

18. The system as claimed in claim 11, wherein the data acquisition controller is configured such that, following a determination that a selected first time slot has an associated set of available parameter retrieval sub-slots that satisfy the identified parameter data retrieval constraints, the data acquisition controller implements the steps of:
    retrieving a scheduling map that stores data representing a number of used parameter retrieval sub-slots or a number of available parameter retrieval sub-slots corresponding to each of the m chronologically ordered time slots, wherein:
    the scheduling map is a variable column table comprising a plurality of rows and columns;
    each row is assigned with a unique value representing a parameter retrieval periodicity value associated with the device parameter, wherein the parameter retrieval periodicity value represents a defined period after which device parameter data retrieval requires to be repeated for the device parameter;
    each row has a variable number of columns, wherein (i) the number of columns assigned to a row is determined by dividing the unique value assigned to such row, by the fixed time interval defined for retrieval of the device parameter from the field device, and (ii) each column represents a specific time slot within the defined chronological period; and
    each cell corresponding to an intersection of a row and a column stores data representing a number of used parameter retrieval sub-slots or a number of available parameter retrieval sub-slots corresponding to a specific time slot;

identifying within the retrieved scheduling map, a row corresponding to the parameter retrieval periodicity value associated with the device parameter;

within the identified row, parse a column corresponding to the selected first time slot; and responsive to determining that the parsed column has an available parameter retrieval sub-slot, schedule retrieval of the device parameter at the time slots represented by the parsed column and all the columns that are capable of being represented as a sum of (a) a time value corresponding to the selected first time slot and (b) an integer multiple of the parameter retrieval periodicity value associated with the device parameter.

19. The system as claimed in claim 18, wherein the data acquisition controller is configured to respond to scheduling of retrieval of the device parameter at one or more time slots, by implementing the steps of:

within the identified row, either(i) increment by one, the number of used parameter retrieval sub-slots associated with the time slot within which the device parameter has been scheduled for retrieval, or (ii) decrement by one, the number of available parameter retrieval sub-slots associated with the time slot within which the device parameter has been scheduled for retrieval;

for each row in the scheduling map that corresponds to a higher parameter retrieval periodicity value than the identified row:

either(i) increment by one, the number of used parameter retrieval sub-slots associated with the time slot within which the device parameter has been scheduled for retrieval, or (ii) decrement by one, the number of available parameter retrieval sub-slots associated with the time slot within which the device parameter has been scheduled for retrieval; and either(i) increment by one, the number of used parameter retrieval sub-slots associated with each column where the corresponding time slot represented by said column is capable of being represented as the sum of (a) a time value corresponding to the time slot within which the device parameter has been scheduled for retrieval and (b) an integer multiple of the parameter retrieval periodicity value associated with the device parameter, or (ii) decrement by one, the number of available parameter retrieval sub-slots associated with each column where the corresponding time slot represented by said column is capable of being represented as the sum of (a) a time value corresponding to the time slot within which the device parameter has been scheduled for retrieval and (b) an integer multiple of the parameter retrieval periodicity value associated with the device parameter; and for each row in the scheduling map that corresponds to a lower parameter retrieval periodicity value than the identified row:

determine a modulus value 'x' by dividing (i) a time value corresponding to the time slot within which retrieval of the device parameter has been scheduled, by (ii) said lower parameter retrieval periodicity value;

either(i) increment by one, the number of used parameter retrieval sub-slots associated with the time slot corresponding to the determined modulus value 'x', or (ii) decrement by one, the number of available parameter retrieval sub-slots associated with the time slot corresponding to the determined modulus value 'x'; and either(i) increment by one, the number of used parameter retrieval sub-slots at each column corresponding to a time slot value that is the modulus of the sum of (a) a time value corresponding to the time slot within which the device parameter has been scheduled for retrieval and (b) an integer multiple of the parameter retrieval periodicity value associated with the device parameter, or (ii) decrement by one, the number of available parameter retrieval sub-slots at each column corresponding to a time slot value that is the modulus of the sum of (a) a time value corresponding to the time slot within which the device parameter has been scheduled for retrieval and (b) an integer multiple of the parameter retrieval periodicity value associated with the device parameter, provided the number of used parameter retrieval sub-slots or number of available parameter retrieval sub-slots has not been previously modified.

20. The system as claimed in claim 11, wherein the data acquisition controller is configured such that the identified one or more parameter data retrieval constraints associated with the device parameter include any of (i) number of device parameters for retrieval, (ii) periodicity of data retrieval required for the device parameter(s), and (iii) any applicable data simultaneity requirement associated with the device parameter.

21. A computer program product for scheduled parameter data retrieval from one or more field devices implemented within a process control environment, the computer program product comprising a non-transitory computer usable medium having a computer readable program code embodied therein, the computer readable program code comprising instructions for implementing within a processor based computing system, the steps of:

responding to an instruction for scheduling retrieval of a device parameter from a field device, by retrieving a scheduling table that represents a defined chronological period in the form of m chronologically ordered time slots, wherein:

the duration of each time slot of the m chronologically ordered time slots is equal to a fixed time interval defined for retrieval of the device parameter from the field device; and each time slot of the m chronologically ordered time slots has p associated parameter retrieval sub-slots, wherein each of the parameter retrieval sub-slots enables retrieval of one device parameter from the field device;

identifying one or more parameter data retrieval constraints associated with the device parameter;

parsing the retrieved scheduling table and identifying a set of available parameter retrieval sub-slots that satisfies the identified parameter data retrieval constraints, wherein parsing the retrieved scheduling table comprises:

(i) selecting from among the m chronologically ordered time slots, a first time slot for analysis, wherein the selected first time slot is representable as a sum of a base time and an offset;

(ii) determining whether the selected first time slot has an associated set of available parameter retrieval sub-slots that satisfy the identified parameter data retrieval constraints;

(iii) responsive to determining that the selected first time slot does not have an associated set of available parameter retrieval sub-slots that satisfy the identified parameter data retrieval constraints:
  modifying the base time;
  selectively modifying the offset in response to modifying the base time;
  selecting a next time slot from among them chronologically ordered time slots for analysis, wherein the selected next time slot is determined by the sum of the modified base time and offset; and
(iv) repeating steps (ii) to (iii) until a selected first time slot is determined as having an associated set of available parameter retrieval sub-slots that satisfy the identified parameter data retrieval constraints; and scheduling retrieval of the device parameter within the selected first time slot, by recording within the scheduling table, data associating each parameter retrieval sub-slot within the identified set of parameter retrieval sub-slots with the device parameter from the field device, wherein the device parameter is retrieved from the field device by a data acquisition controller within a control system of the process control environment, based on the data recorded within the scheduling table, and wherein responsive to receiving the instruction for scheduling retrieval of the device parameter from the field device, selection of the first time slot for analysis includes:
  parsing parameter retrieval sub-slots within one or more of the m chronologically ordered time slots to determine whether one or more of the parsed parameter retrieval sub-slots have already been allocated for retrieval of parameter data that has a first device path that is identical to a second device path associated with the device parameter of the field device; and responsive to determining that the first device path and the second device path are identical, selecting as the selected first ti me slot, a time slot containing the parameter retrieval sub-slots that have already been allocated for retrieval of parameter data that has the first device path.

* * * * *